United States Patent
Mayo et al.

[11] Patent Number: 5,189,156
[45] Date of Patent: * Feb. 23, 1993

[54] PROCESSES FOR THE PREPARATION OF TITANIUM-PHTHALOCYANINE TYPE X

[75] Inventors: James D. Mayo, Toronto; Sandra J. Gardner, Willowdale, both of Canada

[73] Assignee: Xerox Corporation, Stamford, Conn.

[*] Notice: The portion of the term of this patent subsequent to Nov. 24, 2009 has been disclaimed.

[21] Appl. No.: 673,506

[22] Filed: Apr. 1, 1991

[51] Int. Cl.$^5$ .............................................. C09B 67/50
[52] U.S. Cl. ........................................ 540/141; 540/142; 540/143; 430/58; 430/59; 430/78
[58] Field of Search .......................... 540/141, 142, 143

[56] References Cited

U.S. PATENT DOCUMENTS

| | | | |
|---|---|---|---|
| 3,825,422 | 7/1974 | Gruber et al. | 96/1 PE |
| 3,927,026 | 12/1975 | Brach et al. | 260/314.5 |
| 4,443,528 | 4/1984 | Tamura et al. | 430/56 |
| 4,458,004 | 7/1984 | Tanakawa | 430/270 |
| 4,536,461 | 8/1985 | Nakatani et al. | 430/58 |
| 4,607,124 | 8/1986 | Kazmaier et al. | 564/307 |
| 4,643,770 | 2/1987 | Hays | 106/23 |
| 4,664,997 | 5/1987 | Suzuki et al. | 430/58 |
| 4,701,396 | 10/1987 | Hung et al. | 430/58 |
| 4,725,519 | 2/1988 | Suzuki et al. | 430/58 |
| 4,728,592 | 3/1988 | Ohaku et al. | 430/59 |
| 4,771,133 | 9/1988 | Liebermann et al. | 540/143 |
| 4,777,251 | 10/1988 | Tanaka et al. | 540/143 |
| 4,882,427 | 11/1989 | Enokida et al. | 540/141 |
| 4,898,799 | 2/1990 | Fujimaki et al. | 430/59 |

FOREIGN PATENT DOCUMENTS

| | | | |
|---|---|---|---|
| 0314100 | 5/1989 | European Pat. Off. | 540/141 |
| 2-09776 | 11/1990 | Japan . | |

OTHER PUBLICATIONS

JP 03010257, Jan. 17, 1991 (Abstract).
JP 03010258, Jan. 17, 1991 (Abstract).
JP 03011358, Jan. 18, 1991 (Abstract).

*Primary Examiner*—Mukund J. Shah
*Assistant Examiner*—Jyothsna Venkat
*Attorney, Agent, or Firm*—E. O. Palazzo

[57] ABSTRACT

A process for the preparation of titanyl phthalocyanine which comprises the reaction of a titanium tetraalkoxide and diiminoisoindolene in the presence of a halonaphthalene solvent; dissolving the resulting Type I titanyl phthalocyanine in a haloacetic acid and an alkylene halide; adding the resulting mixture slowly to a cold alcohol solution; and thereafter isolating the resulting Type X titanyl phthalocyanine with an average volume particle size diameter of from about 0.02 to about 0.5 micron.

25 Claims, 6 Drawing Sheets

PROCESSES FOR THE PREPARATION OF TITANIUM-PHTHALOCYANINE TYPE X

BACKGROUND OF THE INVENTION

This invention is generally directed to titanyl phthalocyanines and processes for the preparation thereof, and more specifically the present invention is directed to processes for obtaining titanyl phthalocyanine polymorphs or crystal forms, including the known Type I and Type IV, reference for example U.S. Pat. No. 4,898,799, the disclosure of which is totally incorporated herein by reference, Type X and layered photoconductive members comprised of the aforementioned titanyl phthalocyanine polymorphs, especially the Type IV and the Type X. In one embodiment, the present invention is directed to a process for the preparation of titanyl phthalocyanines by the reaction of titanium tetra(alkoxide), especially the butoxide, with diiminoisoindolene in a solvent such as a halonaphthalene thereby enabling a crude titanyl phthalocyanine; thereafter subjecting the aforementioned product to purification by washing with, for example, a solvent like dimethylformamide. The purified titanyl phthalocyanine, especially Type I product obtained can then be dissolved in a solvent mixture of trifluoroacetic acid and methylene chloride. Subsequently, the aforementioned mixture is added. Titanyl phthalocyanine Type IV can be obtained from the titanyl Type X by the treatment of Type X with, for example, chlorobenzene. Layered imaging members with the aforementioned Type IV as a photogenerator, a charge transport, especially an aryl amine as illustrated herein, and a supporting substrate possess excellent photosensitivity. The titanyl phthalocyanines, especially the known polymorph IV and the X form, can be selected as organic photogenerator pigments in photoresponsive imaging members containing charge, especially hole transport layers such as known aryl amine hole transport molecules. The aforementioned photoresponsive imaging members can be negatively charged when the photogenerating layer is situated between the hole transport layer and the substrate, or positively charged when the hole transport layer is situated between the photogenerating layer and the supporting substrate. The layered photoconductive imaging members can be selected for a number of different known imaging and printing processes including, for example, electrophotographic imaging processes, especially xerographic imaging and printing processes wherein negatively charged or positively charged images are rendered visible with toner compositions of the appropriate charge. Generally, the imaging members are sensitive in the wavelength regions of from about 700 to about 850 nanometers, thus diode lasers can be selected as the light source. Titanyl phthalocyanines may also be selected as intense blue light stable colorants for use in coatings, such as paint, inks, and as near infrared absorbing pigments suitable for use as IR laser optical recording materials.

Certain titanium phthalocyanine pigments have been known, reference the publication WW 2(PB 85172 Fiat Final Report 1313, Feb. 1, 1948). However, unlike other phthalocyanines such as metal-free, copper, iron and zinc phthalocyanines, titanium phthalocyanines have had minimum commercial use. Titanyl phthalocyanines or oxytitanium phthalocyanines are known to absorb near-infrared light around 800 nanometers and a number of such pigments have been illustrated in the prior art as materials for IR laser optical recording material, reference for example BASF German 3,643,770 and U.S. Pat. No. 4,458,004. The use of certain titanium phthalocyanine pigments as a photoconductive material for electrophotographic applications is known, reference for example British Patent Publication 1,152,655, the disclosure of which is totally incorporated herein by reference. Also, U.S. Pat. No. 3,825,422 illustrates the use of titanyl phthalocyanine as a photoconductive pigment in an electrophotographic process known as particle electrophoresis. Additionally, the utilization of certain titanyl phthalocyanines and substituted derivatives thereof in a dual layer electrographic device is illustrated in EPO 180931, May 14, 1986. Moreover, the use of tetra- and hexadeca-flouro-substituted titanyl phthalocyanine in an electrophotographic device is illustrated in U.S. Pat. No. 4,701,396. In Japanese Patent Publication 64-171771, August, 1986, there is illustrated the use of titanyl phthalocyanine, which has been treated with a hot solvent, in electrophotography. Further, in German 3,821,628 there is illustrated the utilization of certain titanyl phthalocyanines, and other pigments in electrophotography, and wherein the titanyl phthalocyanines have been purified primarily to reduce the level of ash, volatile contaminants and sodium to below specified levels.

In the aforementioned documents, although synthesis and certain processing conditions were generally disclosed for the preparation of the titanyl phthalocyanine pigments, it is believed that there is no reference to certain crystal phases or polymorphs of the pigment. As mentioned in the textbook *Phthalocyanine Compounds* by Moser and Thomas, the disclosure of which is totally incorporated herein by reference, polymorphism or the ability to form distinct solid state forms is well known in phthalocyanines. For example, metal-free phthalocyanine is known to exist in at least 5 forms designated as alpha, beta, pi, X and tau. Copper phthalocyanine crystal forms known as alpha, beta, gamma, delta, epsilon and pi are also described. These different polymorphic forms are usually distinguishable on the basis of differences in the solid state properties of the materials which can be determined by measurements, such as Differential Scanning Calorimetry, Infrared Spectroscopy, Ultraviolet-Visible-Near Infrared spectroscopy and, especially, X-Ray Powder Diffraction techniques. There appears to be general agreement on the nomenclature used to designate specific polymorphs of commonly used pigments such as metal-free and copper phthalocyanine. However, this does not appear to be the situation with titanyl phthalocyanines as different nomenclature is selected in a number of instances. For example, reference is made to alpha, beta, A, B, C, y, and m forms of TiOPc (titanyl phthalocyanine) with different names being used for the same form in some situations. It is believed that five main crystal forms of TiOPc are known, that is Types I, II, III, X, and IV. The X-ray powder diffraction traces (XRPDs) obtained from these 5 forms which are shown in FIGS. 1A, 1B, 1C, 1D and 1E were generated on a Philips X-Ray Powder Diffractometer Model 1710 using X-radiation of CuK$\alpha$ wavelength ($\lambda = 0.1542$ nanometer). The diffractometer was equipped with a graphite monochrometer and pulseheight discrimination system. Two-theta is the Bragg angle commonly referred to in x-ray crystallographic measurements. I (counts) represents the intensity of the diffraction as a function of Bragg angle as measured with a proportional counter. Subclasses of these forms with broad, more poorly resolved peaks than those shown in FIGS. 1A, 1B, 1C and 1D can be envisioned, however, the basic features of the diffractograms indicate the major peaks in the same position although the smaller peaks can be unresolved. This broadening of XRPD peaks is generally found in pigments having a very small particle size. In Table 1 that follows, there is provided a listing of documents that disclose titanyl phthalocyanine polymorpic forms classified as belonging to one of the main types as indicated.

TABLE 1

| Crystal Form | Other Names | Documents |
|---|---|---|
| Type I | β | Toyo Ink Electrophotog. (Japan) 27, 533 (1988) |
| | β | Dainippon US 4,728,592 |
| | β | Sanyo-Shikiso JOP 63-20365 |
| | A | Mitsubishi JOP 62-25685, -6, -7 Conference Proceedings |
| | A | Konica "Japan Hardcopy 1989", 103, (1989) |
| Type II | α | Toyo Ink "Electrophoto (Japan)" 27, 533 (1988) |
| | α | Sanyo-Shikiso JOP 63-20365 |
| | α | Konica US 4,898,799 |
| | α | Dainippon US 4,728,592 |
| | α | Mita EU 314,100 |
| | B | Mitsubishi JOP 62-25685, -6, -7 |
| | B | Konica "Japan Hardcopy 1989, 103, (1989) |
| Type III | C | Mitsubishi OP 62-25685, -6, -7 |
| | C | Konica "Japan Hardcopy 1989, 103, (1989) |
| | m | Toyo Ink "Electrophoto (Japan)" 27, 533 (1988) |
| Type IV | y | Konica "Japan Hardcopy 1989", 103, (1989) |
| | Unnamed | Konica US 4,898,799 |
| | New Type | Sanyo-Shikiso JOP 63-20365 |

More specifically, the aforementioned documents illustrate, for example, the use of specific polymorphs of TiOPc in electrophotographic devices. Three crystal forms of titanyl phthalocyanine, differentiated by their XRPDs, were specifically illustrated, identified as A, B, and C, which it is believed are equivalent to Types I, II, and III, respectively. In Japanese 62-256865 there is disclosed, for example, a process for the preparation of pure Type I involving the addition of titanium tetrachloride to a solution of phthalonitrile in an organic solvent which has been heated in advance to a temperature of from 160° to 300° C. In Japanese 62-256866, there is illustrated, for example, a method of preparing the aforementioned polymorph which involves the rapid heating of a mixture of phthalonitrile and titanium tetrachloride in an organic solvent at a temperature of from 100° to 170° C. over a time period which does not exceed one hour. In Japanese 62-256867, there is described, for example, a process for the preparation of pure Type II (B) titanyl phthalocyanine, which involves a similar method to the latter except that the time to heat the mixture at from 100° to 170° C., is maintained for at least two and one half hours. Types I and II, in the pure form obtained by the process of the above publications, apparently afforded layered photoresponsive imaging members with excellent electrophotographic characteristics.

In Mita EPO patent publication 314,100, there is illustrated the synthesis of TiOPc by, for example, the reaction of titanium alkoxides and diiminoisoindolene in quinoline or an alkylbenzene, and the subsequent conversion thereof to an alpha Type pigment (Type II) by an acid pasting process, whereby the synthesized pigment is dissolved in concentrated sulfuric acid, and the resultant solution is poured onto ice to precipitate the alpha-form, which is filtered and washed with methylene chloride. This pigment, which was blended with varying amounts of metal free phthalocyanine, could be selected as the electric charge generating layer in layered photoresponsive imaging members with a high photosensitivity at, for example, 780 nanometers.

In Sanyo-Shikiso Japanese 63-20365/86, reference is made to the known crystal forms alpha and beta TiOPc (Types II and I, respectively, it is believed), which publication also describes a process for the preparation of a new form of titanyl phthalocyanine, which is apparently not named. This publication appears to suggest the use of the unnamed titanyl phthalocyanine as a pigment and its use as a recording medium for optical discs. This apparently new form was prepared by treating acid pasted TiOPc (Type II form, it is believed) with a mixture of chlorobenzene and water at about 50° C. The resulting apparently new form is distinguished on the basis of its XRPD, which appears to be identical to that shown in FIG. 1 for the Type IV polymorph.

In U.S. Pat. No. 4,728,592, there is illustrated, for example, the use of alpha type TiOPc (Type II) in an electrophotographic device having sensitivity over a broad wavelength range of from 500 to 900 nanometers. This form was prepared by the treatment of dichlorotitanium phthalocyanine with concentrated aqueous ammonia and pyridine at reflux for 1 hour. Also described in the aforementioned patent is a beta Type TiOPc (Type I) as a pigment, which is believed to provide a much poorer quality photoreceptor.

In Konica Japanese 64-17066/89, there is disclosed, for example, the use of a new crystal modification of TiOPc prepared from alpha type pigment (Type II) by milling it in a sand mill with salt and polyethylene glycol. This pigment had a strong XRPD peak at a value of 2 theta of 27.3 degrees. This publication also discloses that this new form differs from alpha type pigment (Type II) in its light absorption and shows a maximum absorbance at 817 nanometers compared to alpha type, which has a maximum at 830 nanometers. The XRPD shown in the publication for this new form is believed to be identical to that of the Type IV form previously described by Sanyo-Shikiso in JOP 63-20365. The aforementioned Konica publication also discloses the use of this new form of TiOPc in a layered electrophotographic device having high sensitivity to near infrared light of 780 nanometers. The new form is indicated to be superior in this application to alpha type TiOPc (Type II). Further, this new form is also described in U.S. Pat. No. 4,898,799 and in a paper presented at the Annual Conference of Japan Hardcopy in July 1989. In this paper, this same new form is referred to as Type y, and reference is also made to Types I, II, and III as A, B, and C, respectively.

In the journal, *Electrophotography* (Japan) vol. 27, pages 533 to 538, Toyo Ink Manufacturing Company, there is disclosed, for example, alpha and beta forms of TiOPc (Types I and II, it is believed) and also this journal discloses the preparation of a Type m TiOPc, an apparently new form having an XRPD pattern which was distinct from other crystal forms. It is believed that this XRPD is similar to that for the Type III titanyl phthalocyanine pigment but it is broadened most likely as the particle size is much smaller than that usually found in the Type III pigment. This pigment was used to prepare photoreceptor devices having greater sensitivity at 830 nanometers than alpha or beta Type TiOPc (Type II or I, respectively).

In Mitsubishi Laid Open Japanese Applicaiton 90-269776, laid open date Nov. 5, 1990, the disclosure of which is totally incorporated herein by reference, there is illustrated the preparation of titanyl phthalocyanines by the treatment of phthalocyanines, such as metal free, metal phthalocyanines, or their derivatives with solvents containing at least trifluoroacetic acid, or mixed solvents of trifluoroacetic acid and halogenated hydrocarbons such as methylene chloride. In Example I of this Japanese Laid Open Application the preparation of the C-form of TiOPc is described. Other forms obtained are described in Examples II and III.

Processes for the preparation of specific polymorphs of titanyl phthalocyanine, which require the use of a strong acid such as sulfuric acid, are known, and these processes, it is believed, are not easily scable. One process as illustrated in Konica Japanese Laid Open on Jan. 20, 1989 as 64-17066 (U.S. Pat. No. 4,898,799 appears to be its equivalent), the disclosure of which is totally incorporated herein by reference, involves, for example, the reaction of titanium tetrachloride and phthalodinitrile in 1-chloronaphthalene solvent to produce dichlorotitanium phthalocyanine which is then subjected to hydroylsis by ammonia water to enable the Type II polymorph. This phthalocyanine is preferably treated with an electron releasing solvent such as 2-ethoxyethanol, dioxane, N-methylpyrrolidone, followed by subjecting the alpha-titanyl phthalocyanine to milling at a temperature of from 50° to 180° C. In a second method described in the aforementioned Japanese Publication, there is disclosed the preparation of alpha type titanyl phthalocyanine with sulfuric acid. Another method for the preparation of Type IV titanyl phthalocyanine involves the addition of an aromatic hydrocarbon, such as chlorobenzene solvent to an aqueous suspension of Type II titanyl phthalocyanine prepared by the well-known acid pasting process, and heating the resultant suspension to about 50° C. as disclosed in Sanyo-Shikiso Japanese 63-20365, Laid Open in Jan. 28, 1988. In Japanese 171771/1986, Laid Open Aug. 2, 1986, there is disclosed the purification of metallophthalocyanine by treatment with N-methylpyrrolidone.

To obtain a TiOPc-based photoreceptor having high sensitivity to near infrared light, it is believed necessary to control not only the purity and chemical structure of the pigment, as is generally the situation with organic photoconductors, but also to prepare the pigment in the correct crystal modification. The disclosed processes used to prepare specific crystal forms of TiOPc, such as Types I, II, III and IV are either complicated and difficult to control as in the preparation of pure Types I and II pigment by careful control of the synthesis parameters by the processes described in Mitsubishi Japanese 62-25685, -6 and -7, or involve harsh treatment such as sand milling at high temperature, reference Konica U.S. Pat. No. 4,898,799; or dissolution of the pigment in a large volume of concentrated sulfuric acid, a solvent which is known to cause decomposition of metal phthalocyanines, reference Sanyo-Shikiso Japanese 63-20365, and Mita EPO 314,100.

The present invention in one embodiment relates to an economical method for the preparation of polymorphs of TiOPc, specifically the Type I, X, and IV polymorphs. Advantages of the aforementioned methods in embodiments thereof include rapid reaction rates, the use of harsh reagents such as sulfuric acid or the use of energy intensive processes such as sand milling can be avoided. The process of the present invention in one embodiment involves the reaction of diiminoisoindolene ($DI^3$) with titanium tetrapropoxide in a chloronaphthalene solvent to provide Type I crude, followed by the purification thereof by washing with dimethylformamide to provide a pure form, about 99 percent for example of Type I titanyl phthalocyanine. Thereafter, the Type I phthalocyanine obtained is reacted with a strong organic acid such as trifluoroacetic acid and a solvent such as methylene chloride (the titanyl phthalocyanine pigment is highly soluble in this mixture, dissolves within minutes and is stable for at least about two weeks in embodiments); followed by a reprecipitation of the pigment into a second solvent system. The composition of the precipitant solvent primarily determines which polymorphic form of TiOPc can be obtained. The desired polymorphic form can be isolated by a simple filtration process and can be washed with water and/or organic solvents to attain a suitable degree of purity.

Generally, layered photoresponsive imaging members are described in a number of U.S. patents, such as U.S. Pat. No. 4,265,900, the disclosure of which is totally incorporated herein by reference, wherein there is illustrated an imaging member comprised of a photogenerating layer, and an aryl amine hole transport layer. Examples of photogenerating layer components include trigonal selenium, metal phthalocyanines, vanadyl phthalocyanines, and metal free phthalocyanines. Additionally, there is described in U.S. Pat. No. 3,121,006 a composite xerographic photoconductive member comprised of finely divided particles of a photoconductive inorganic compound dispersed in an electrically insulating organic resin binder. The binder materials disclosed in the '006 patent comprise a material which is incapable of transporting for any significant distance injected charge carriers generated by the photoconductive particles.

Photoresponsive imaging members with squaraine photogenerating pigments are also known, reference U.S. Pat. No. 4,415,639. In this patent there is illustrated a photoresponsive imaging member with a substrate, a hole blocking layer, an optional adhesive interface layer, an organic photogenerating layer, a photoconductive composition capable of enhancing or reducing the intrinsic properties of the photogenerating layer, and a hole transport layer. As photoconductive compositions for the aforementioned member, there can be selected various squaraine pigments, including hydroxy squaraine compositions. Moreover, there is disclosed in U.S. Pat. No. 3,824,099 certain photosensitive hydroxy squaraine compositions.

In copending application U.S. Ser. No. 537,714 filed Jun. 14, 1990, the disclosure of which is totally incorporated herein by reference, there are illustrated photoresponsive imaging members with photogenerating titanyl phthalocyanine layers prepared by vacuum deposition. It is indicated in this copending application that the imaging members comprised of the vacuum deposited titanyl phthalocyanines and aryl amine hole transporting compounds exhibit superior xerographic performance as low dark decay characteristics result and higher photosensitivity is generated, particularly in comparison to several prior art imaging members prepared by solution coating or spray coating, reference for example U.S. Pat. No. 4,429,029 mentioned hereinbefore.

In copending application U.S. Ser. No. 533,265 filed Jun. 14, 1990, the disclosure of which is totally incorporated herein by reference, there is illustrated a process for the preparation of phthalocyanine composites which comprises adding a metal free phthalocyanine, a metal phthalocyanine, a metalloxy phthalocyanine or mixtures thereof to a solution of trifluoroacetic acid and a monohaloalkane; adding to the resulting mixture a titanyl phthalocyanine; adding the resulting solution to a mixture that will enable precipitation of said composite; and recovering the phthalocyanine composite precipitated product.

In copending application U.S. Ser. No. 533,261 filed Jun. 4, 1990, the disclosure of which is totally incorporated herein by reference, there is illustrated a process for the preparation of titanyl phthalocyanine which comprises the reaction of titanium tetrapropoxide with diiminoisoindolene in N-methylpyrrolidone solvent to provide Type I, or β-type titanyl phthalocyanine as determined by X-ray powder diffraction; dissolving the resulting titanyl phthalocyanine in a mixture of trifluoroacetic acid and methylene chloride; adding the resulting mixture to a stirred organic solvent, such as methanol, or to water; separating the resulting precipitate by, for example, vacuum filtration through a glass fiber paper in a Buchner funnel; and washing the titanyl phthalocyanine product. Examples of titanyl phthalocyanine reactants that can be selected in effective amounts of, for example, from about 1 weight percent to about 40 percent by weight of the trifluoroacetic acidic solvent mixture include known available titanyl phthalocyanines; titanyl phthalocyanines synthesized from the reaction of titanium halides such as titanium trichloride, titanium tetrachloride or tetrabromide; titanium tetraalkoxides such as titanium tetra-methoxide, -ethoxide, -propoxide-, -butoxide, -isopropoxide and the like; and other titanium salts with compounds such as phthalonitrile and diiminoisoindolene in solvents such as 1-chloronaphthalene, quinoline, N-methylpyrrolidone, and alkylbenzenes such as xylene at temperatures of from about 120° to about 300° C.; specific polymorphs of titanyl phthalocyanine such as Type I, II, III, and IV, the preparation of which, for example, is described in the literature; or any other suitable polymorphic form of TiOPc; substituted titanyl phthalocyanine pigments having from 1 to 16 substituents attached to the outer ring of the compound, said substituent being, for example, halogens such as chloro-, bromo-, iodo- and fluoro-, alkyls with from 1 to about 6 carbon atoms such as methyl-, ethyl-, propyl-, isopropyl-, butyl-, pentyl-, and hexyl-; nitro, amino, alkoxy and alkylthio, such as methoxy-, ethoxy- and propylthio- groups; and mixtures thereof. As the solvent mixture, there can be selected a strong organic acid, such as a trihaloacetic acids, including trifluoroacetic acid or trichloroacetic acid, and a cosolvent, such as an alkylene halide, such as methylene chloride, chloroform, trichloroethylene, bromoform and other short chain halogenated alkanes and alkenes with from 1 to about 6 carbon atoms and from 1 to about 6 halogen atoms including chlorofluorocarbons and hydrochlorofluorocarbons; haloaromatic compounds such as chlorobenzene, dichlorobenzene, chloronaphthalene, fluorobenzene, bromobenzene, and benzene; alkylbenzenes such as toluene and xylene; and other organic solvents which are miscible with strong organic acids and which will effectively dissolve the titanyl phthalocyanine in effective amounts of, for example, a ratio of from about 1 to 50 parts of acid to about 50 parts of cosolvent such as methylene chloride. In an embodiment a preferred solvent mixture is comprised of trifluoroacetic acid and methylene chloride in a ratio of from about 5 parts acid to about 95 parts methylene chloride to 25 parts acid to 75 parts of methylene chloride. Subsequent to solubilization with the above solvent mixture and stirring for an effective period of time of, for example, from about 5 minutes to several days, the resulting mixture is added to a solvent that will enable precipitation of the desired titanyl phthalocyanine polymorph, such as Type IV, which solvent is comprised of an alcohol such as an alkylacohol including methanol, ethanol, propanol, isopropanol, butanol, n-butanol, pentanol and the like; ethers such as diethyl ether and tetrahydrofuran; hydrocarbons such as pentane, hexane and the like with, for example, from about 4 to about 10 carbon atoms; aromatic solvents such as benzene, toluene, xylene, halobenzenes such as chlorobenzene, and the like; carbonyl compounds such as ketones such as acetone, methyl ethyl ketone, and butyraldehyde; glycols such as ethylene and propylene glycol and glycerol; polar aprotic solvents such as dimethyl sulfoxide, dimethylformamide and N-methylpyrrolidone; and water, as well as mixtures of the aforementioned solvents, followed by filtration of the titanyl phthalocyanine polymorph, and washing with various solvents such as, for example, deionized water and an alcohol such as methanol and the like, which serves to remove residual acid and any impurities which might have been released by the process of dissolving and reprecipitating the pigment. The solid resulting can then be dried by, for example, heating yielding a dark blue pigment of the desired titanyl phthalocyanine polymorph, the form of which was determined by the composition of the precipitant solvent. In working Example III of the aforementioned copending application U.S. Ser. No. 533,261 filed Jun. 4, 1990 there is disclosed the preparation of Type X titanyl phthalocyanine by adding Type I to a mixture of trifluoroacetic acid and methylene chloride.

Disclosed in copending patent application U.S. Ser. No. 533,265 filed Jun. 4, 1990 is a process for the preparation of titanyl phthalocyanine Type I which comprises the addition in a solvent of titanium tetraalkoxide to a mixture of phthalonitrile and a diiminoisoindolene, followed by heating. The disclosure of this application is totally incorporated herein by reference.

Disclosed in copending applications U.S. Ser. No. 683,901 filed Apr. 11, 1991, entitled "Titanium Phthalocyanines and Processes for the Preparation Thereof" with inventors James D. Mayo, Terry L. Bluhm, Cheng K. Hsiao, Trevor I. Martin and Ah-Mee Hor; and U.S. Ser. No. 683,935 filed Apr. 11, 1991, entitled "Processes for Titanyl Phthalocyanines" with inventors James D. Mayo, James M. Duff, Trevor I. Martin, Terry L. Bluhm, Cheng K. Hsiao and Ah-Mee Hor, is a process for the preparation of titanyl phthalocyanine which comprises the treatment of titanyl phthalocyanine Type X with a halobenzene, the disclosures of which are totally incorporated herein by reference.

The disclosures of all of the aforementioned publications, laid open applications, copending applications and patents are totally incorporated herein by reference.

SUMMARY OF THE INVENTION

It is a feature of the present invention to provide processes for the preparation of titanyl phthalocyanines with many of the advantages illustrated herein.

It is yet another feature of the present invention to provide processes for the preparation of Type I titanyl phthalocyanine by the reaction of titanium tetraalkoxide, especially the tetrabutoxide with DI$^3$ and halonaphthalene, especially chloronaphthalene, adding the resulting mixture slowly, for example dropwise, over an effective period of, for example, from about 10 minutes to about 30 minutes, and preferably about 20 minutes, to an alcohol, especially a methanol water solution to provide a Type X titanyl phthalocyanine with a particle size diameter of, for example, from about 0.05 to about 0.1, and preferably from about 0.05 to about 0.5 micron. The aforementioned Type X can be converted to Type IV by the treatment thereof with, for example, chlorobenzene.

Another feature of the present invention relates to the preparation of titanyl phthalocyanine polymorphs, including those known as Type I, Type X, and Type IV.

Further, another feature of the present invention relates to the preparation of photogenerating titanyl phthalocyanines by the reaction of titanium tetrabutoxide with DI$^3$ and chloronaphthalene followed by washing; converting the Type I obtained to Type X by the dissolution of Type I in trifluoroacetic acid and methylene chloride, followed by reprecipitation of the dissolved Type I pigment in a cosolvent mixture of, for example, methanol and water; and thereafter slurrying the resulting Type X in chlorobenzene to obtain Type IV titanyl phthalocyanine. The Type I titanyl phthalocyanine (TiOPc) may also be selected as a photogenerating pigment in a layered imaging member.

Also, in another feature of the present invnetion there are provided processes for the preparation of titanyl phthalocyanines, especially titanyl phthalocyanine Type X with small average diameter particle sizes, for example from about 0.05 to about 0.1 micron as determined by SEM (scanning electron microscopy). Layered imaging members comprised of the aforementioned titanyl phthalocyanines possess excellent photosensitivity characteristics.

Another feature of the present invention resides in a process for the preparation of Type I titanyl phthalocyanine, which, when converted to Type IV by known means, or by the processes illustrated herein affords Type IV titanyl phthalocyanine with excellent xerographic photosensitivity when the Type IV is selected as a photogenerator in a layered imaging member. The xerographic electrical properties of the imaging members, including Devices 1 and 2 of Table 4, can be determined by known means, including as indicated herein electrostatically charging the sufaces thereof with a corona discharge source until the surface potentials, as measured by a capacitively coupled probe attached to an electrometer, attained an initial value $V_0$ of about $-800$ volts. After resting for 0.5 second in the dark, the charged members attained a surface potential of $V_{ddp}$, dark development potential, and each member was then exposed to light from a filtered Xenon lamp with a XBO 150 watt bulb. A reduction in surface potential to a $V_{bg}$ value, background potential, due to photodischarge effect was observed. The dark decay in volts/second was calculated as $(V_o - V_{ddp})/0.5$. The percent of photodischarge was calculated as 100 percent $(V_{ddp} - V_{bg})/V_{ddp}$. The desired wavelength and energy of the exposed light was determined by the type of filters placed in front of the lamp. The broad band white light (400 to 700 nanometers) photosensitivity of these imaging members was measured by using an infrared cut-off filter whereas the monochromatic light photosensitivity was determined using a narrow band-pass filter. The photosensitivity of the imaging members is usually provided in terms of the amount of expose energy in ergs/cm$^2$, designated as $E_{\frac{1}{2}}$, required to achieve 50 percent photodischarge from the dark development potential. The higher the photosensitivity, the smaller is the $E_{\frac{1}{2}}$ value.

Another feature of the present invention is that the process described herein in an embodiment allows the preparation of TiOPc, X-form.

Another feature of the present invention is an embodiment thereof resides in the preparation of TiOPc polymorphs, especially Type IV, having a small particle size of about 0.1 micron which is advantageous for the preparation of electrophotographic devices since, for example, the prepared polymorphs can be easily dispersed in coating compositions.

A further specific object of the present invention resides in the provision of photoresponsive imaging members with an aryl amine hole transport layer, and a photogenerator layer comprised of the titanyl phthalocyanine pigments X-form, Type I or Type IV.

These and other features of the present invention can be accomplished in embodiments thereof by the provision of processes for the preparation of titanyl phthalocyanines and photoresponsive imaging members thereof. More specifically, in one embodiment of the present invention there are provided processes for the preparation of titanyl phthalocyanine (TiOPc) polymorphs, which comprises the solubilization of a titanyl phthalocyanine Type I in a mixture of trifluoroacetic acid and methylene chloride, adding the resulting mixture slowly, for example dropwise, to an aliphatic alcohol with from 1 to about 12 carbon atoms, such as methanol, ethanol, propanol, butanol, and the like; precipitation of the desired titanyl phthalocyanine, such as Type X, separation by, for example, filtration, and optionally subjecting the product to washing, and thereafter treating the Type X titanyl phthalocyanine obtained with a halo, such as a chlorobenzene, to obtain Type IV titanyl phthalocyanine. The product can be identified by various known means including X-ray powder diffraction (XRPD).

In one embodiment the present invention is directed to the preparation of Type I titanyl phthalocyanine by the reaction of titanium tetraalkoxide, especially the tetrabutoxide with DI$^3$ and halonaphthalene, especially 1-chloronaphthalene, dissolving the resulting Type I titanyl phthalocyanine in a haloacetic acid, especially trifluoroacetic acid and an alkylene halide, especially methylene chloride, in an effective ratio of, for example, 1:4 volume ratio, adding the resulting mixture slowly, for example dropwise, over an effective period of, for example, from about 10 minutes to about 30 minutes, and preferably about 20 minutes, to an alcohol, especially a cold methanol water solution, in an effective ratio amount of, for example, 1:1 to provide after isolation by, for example, filtration a Type X with a particle size diameter of, for example, from about 0.05 to about 0.1, and preferably from about 0.05 to about 0.5 microns. The aforementioned Type X can be converted to Type IV by the treatment thereof with, for example, chlorobenzene as illustrated herein. The aforementioned mixture solution is cooled by, for example, an ice bath, enabling a temperature in an embodiment of less than about 0° C. and preferably less than about 5° C., and more preferably about a minus 10° C.

One embodiment of the present invention is directed to processes for the preparation of titanyl phthalocyanine Type I, which comprise the reaction of titanium tetraalkoxide, especially the tetrabutoxide with diiminoisoindolene in a chloronaphthalene solvent to provide crude Type I titanyl phthalocyanine, which is subsequently washed with a component such as dimethylformamide to provide a pure form of Type I as determined by X-ray powder diffraction; dissolving the resulting titanyl phthalocyanine in a mixture of trifluoroacetic acid and methylene chloride; adding the resulting mixture to a stirred organic solvent, such as methanol, and/or water; separating the resulting precipitate by, for example, vacuum filtration through a glass fiber paper in a Buchner funnel; and washing the titanyl phthalocyanine product obtained. When the Type X product is obtained it can be converted to Type IV by the treatment thereof with chlorobenzene. In embodiments when a mixture of alcohol, especially methanol, and water are selected in a ratio of from about 60:40, from about 35:65, and preferably a 50:50, there is obtained the Type X titanyl phthalocyanine. Type IV titanyl phthalocyanine is usually obtained when the alcohol, especially methanol, to water ratio is from about 30:70, 0:100, and preferably 25:75. Also, the aforementioned Type IV phthalocyanine can be treated, or washed with chlorobenzene providing a Type IV with excellent imaging member photosensitivity. For the aforementioned treatment, about 1:1, 10:1, and preferably 3:1 chlorobenzene to phthalocyanine Type IV are selected.

For the preparation of Type I titanyl phthalocyanine the process in an embodiment comprises the reaction of DI$^3$ (1,3-diiminoisoindolene) and tetrabutoxide in the presence of 1-chloronaphthalene solvent, whereby there is obtained a crude titanyl phthalocyanine Type I, which is subsequently purified, up to about a 99.5 percent purity, by washing with, for example, dimethylformamide.

Type I titanyl phthalocyanine can also be prepared by 1) the addition of 1 part titanium tetrabutoxide to a stirred solution of from about 1 part to about 10 parts and preferably about 4 parts of 1,3-diiminoisoindolene; 2) relatively slow application of heat using an appropriate sized heating mantle at a rate of about 1 degree per minute to about 10 degrees per minute and preferably about 5 degrees per minute until refluxing occurs at a temperature of about 130 degrees to about 180 degrees; 3) removal and collection of the resulting distillate, which was shown by NMR spectroscopy to be butyl alcohol, in a dropwise fashion, using an appropriate apparatus such as a Claisen Head condenser, until the temperature of the reactants reaches from 190 degrees to about 230° C. (all temperatures are in Centigrade unless otherwise indicated) and preferably about 200 degrees; 4) continued stirring at said reflux temperature for a period of about ½ hour to about 8 hours and preferably about 2 hours; 5) cooling of the reactants to a temperature of about 130 degrees to about 180 degrees, and preferably about 160 degrees, by removal of the heat source; 6) filtration of the flask contents through, for example, an M-porosity (10 to 15 μm) sintered glass funnel which was preheated using a solvent which is capable of raising the temperature of said funnel to about 150 degrees, for example, boiling N,N-dimethylformamide in an amount sufficient to completely cover the bottom of the filter funnel so as to prevent blockage of said funnel; 7) washing the resulting purple solid by slurrying said solid in portions of boiling DMF either in the funnel or in a separate vessel in a ratio of about 1 to about 10, and preferably about 3 times the volume of the solid being washed, until the hot filtrate became light blue in color; 8) cooling and further washing the solid of impurities by slurrying said solid in portions of N,N-dimethylformamide at room temperature, about 25 degrees, approximately equivalent to about three times blue in color; 9) washing the solid of impurities by slurrying said solid in portions of an organic solvent, such as methanol, acetone, water and the like, and in this embodiment methanol, at room temperature, about 25 degrees, approximately equivalent to about three times the volume of the solid being washed, until the filtrate became light blue in color; 10) oven drying the purple solid in the presence of a vacuum or in air at a temperature of from about 25 degrees to about 200 degrees, and preferably about 70 degrees, for a period of from about 2 hours to about 48 hours and preferably about 24 hours thereby resulting in the isolation of a shiny purple solid which was identified as being Type I titanyl phthalocyanine by its X-ray powder diffraction trace.

The Type I titanyl phthalocyanine obtained can then be converted to Type X titanyl phthalocyanine by the dissolution thereof in trifluoroacetic acid and methylene chloride, and thereafter reprecipitating the product obtained dissolved pigment in a solvent mixture of, for example, methanol and water, reference U.S. Ser. No. 533,261, the disclosure of which has been totally incorporated herein by reference. In a specific embodiment, the process of the present invention, the Type I titanyl phthalocyanine obtained, can be converted to Type IV by 1) dissolving 1 weight part of the Type I pigment in a ratio of from about 1 volume part to about 100 volume parts and in this embodiment about 10 volume parts of a solvent comprised of 1 volume part of a haloacetic acid, and in this embodiment trifluoroacetic acid, and from about 1 volume part to about 100 volume parts, and preferably from about 1 volume part to about 10 volume parts and in this embodiment 4 volume parts of a cosolvent comprised of halogenated hydrocarbons, such as methylene chloride, by stirring said pigment in said solvent mixture for an effective period of time from about 30 seconds to about 24 hours, and in this embodiment about 5 minutes at room temperature, about 25 degrees, in air or under an inert atmosphere such as argon or nitrogen; 2) reprecipitating said dissolved Type I titanyl phthalocyanine pigment by adding the dissolved solution in a dropwise manner at a rate of about 0.5 milliliter per minute to about 10 milliliters per minute and in this embodiment about 1 milliliter per minute to a nonsolvent comprised of but not limited to alcohols, such as methanol, ethanol, isopropanol, butanol and the like, ketones such as acetone, methyl ethyl ketone, isobutyl ketone and the like, water, N,N-dimethylformamide, tetrahydrofuran or mixtures thereof, and in this embodiment a mixture comprised of 1 volume part of methanol and 1 volume part of water, which solvent mixture was chilled to a temperature of from about −25 degrees to about 10 degrees and in this embodiment about 2 degrees while being stirred at a rate sufficient to create a vortex extending to the bottom of the flask containing said solvent mixture; 3) filtering the dark blue suspension through a glass fiber filter fitted in a porcelain funnel; 4) washing the isolated solid by redispersing in an organic solvent such as methanol or acetone or the like by stirring for a period of from about 1 minute to about 24 hours and in this embodiment about 1 hour in an amount of from about 10 volume parts to about 100 volume parts and in this embodiment about 50 volume parts relative to the original weight of solid Type I pigment used, followed by filtration as illustrated herein; 5) further washing by redispersing in deionized water which was heated to a temperature of from about 75 degrees to about 100 degrees and in this embodiment about 95 degrees in an amount of from about 10 volume parts to about 100 volume parts and in this embodiment about 50 volume parts relative to the original weight of solid Type I pigment used, followed by filtration as illustrated herein; 6) repeating step 5); 7) drying the resulting blue pigment in air or in the presence of a vacuum at a temperature of from about 25 degrees to about 200 degrees and in this embodiment in air at about 70 degrees for a period of from about 5 minutes to about 48 hours and in this embodiment about 1 hour to afford a dark blue powder in a desirable yield of from about 75 percent to about 99 percent and in this embodiment about 97 percent which has been identified as being Type X titanyl phthalocyanine on the basis of its XRPD spectrum. The aforementioned Type X titanyl phthalocyanine can be selected as a photogenerator for use in a layered photoconductive device or imaging member, or can be utilized as an intermediate for the conversion thereof to Type IV titanyl phthalocyanine by the treatment thereof with chlorobenzene in the presence of, for example, an alcohol-water mixture in certain ratios as illustrated herein. Other cosolvents can be selected in the place of methylene chloride, it is believed, such as chloroform, carbon tetrachloride and the like, alcohols such as methanol, ethanol, isopropanol, butanol and the like, ketones such as acetone, methyl ethyl ketone, methyl isobutyl ketone and the like, tetrahydrofuran, N,N-dimethylformamide, and the like.

Subsequently, the Type X titanyl phthalocyanine thus obtained can be treated with a halogenated aromatic solvent, such as chlorobenzene to provide Type IV titanyl phthalocyanine having excellent xerographic characteristics when selected as a photogenerator in a layered photoconductive imaging member with a supporting substrated and a charge transport layer. Other solvents may be selected in place of the chlorobenzene, it is believed, such as tetrahydrofuran, bromobenzene, 1,2,4,trichlorobenzene, 1,1,2,trichloromethane, fluorobenzene, xylenes, and the like. In an embodiment the xerographic characteristics of the aforementioned imaging member with a titanyl phthalocyanine Type IV photogenerator, an aryldiamine charge transport as the top layer, and an alumimum substrate in contact with the photogenerating layer were $E_{\frac{1}{2}}=0.8$ ergs/cm$^2$, dark decay=5 to 15 volts/second, and a discharge at 5 and 10 ergs/cm$^2$ of 87 and 90 percent, respectively. When utilizing Type X as an intermediate to achieve Type IV, a number of advantages are provided as compared to, for example, obtaining Type IV from Type I directly. Furthermore, it has been determined that the treatment of the Type X intermediate with chlorobenzene affords Type IV titanyl phthalocyanines having higher xerographic photosensitivity than when a Type IV intermediate is treated in a similar manner.

For example, a Type IV pigment was prepared by dissolution of a Type I pigment obtained, for example, by the processes as disclosed herein followed by reprecipitation in a mixture of 1:1 methanol/water to afford Type X titanyl phthalocyanine as determined by an X-ray powder diffraction trace. Treatment of the aforementioned Type X intermediate with chlorobenzene as illustrated herein provided Type IV titanyl phthalocyanine having in an imaging member embodiment an $E_{\frac{1}{2}}=0.8$ ergs/cm$^2$, dark decay=5 to 15 volts/second, and a discharge at 5 and 10 ergs/cm$^2$ of 87 and 90 percent, respectively, when the so obtained Type IV was selected as a photogenerator in a layered imaging member.

When the dissolved Type I titanyl phthalocyanine pigment was reprecipitated in a mixture of 25/75 methanol/water, the product was Type IV titanyl phthalocyanine as determined by an X-ray powder diffraction trace. Treatment of the Type IV intermediate with chlorobenzene as illustrated herein afforded Type IV titanyl phthalocyanine having electrical characteristics for an imaging member of $E_{\frac{1}{2}}=1.3$ ergs/cm$^2$, dark decay=31 volts/second, and a discharge at 5 and 10 ergs/cm$^2$ of 81 and 87 percent, respectively. Type X or Type IV can be obtained depending, for example, on the ratio of alcohol, especially methanol, to water selected as illustrated herein.

The imaging members can be comprised of the specific components mentioned herein, and in Table 4, wherein Devices 1 and 2 are substantially equivalent for each of the measured characteristics illustrated.

In a specific embodiment, the Type X can be treated with chlorobenzene immediately following the second hot water wash (step 6) by 1) redispersing the wet filter cake containing 1 part of solid Type X titanyl phthalocyanine so obtained in chlorobenzene in an amount of from about 10 parts to about 100 parts and in this embodiment about 50 parts relative to the weight of solid Type X pigment used by stirring for an effective period of time, from about 5 minutes to about 2 hours, and in this embodiment about 1 hour, followed by filtering as above; 2) drying the resulting blue pigment in air or in the presence of a vacuum at a temperature of from about 25 degrees to about 200 degrees and in this embodiment in air at about 70 degrees for a period of from about 5 minutes to about 48 hours, and in this embodiment about 1 hour to afford a dark blue powder in a desirable yield of from about 75 percent to about 99 percent, and in this embodiment about 97 percent which has been identified as being Type IV titanyl phthalocyanine on the basis of its XRPD spectrum.

As one solvent mixture for conversion of Type I, there can be selected a strong organic acid, such as a trihaloacetic acids, including trifluoroacetic acid or trichloroacetic acid, and a cosolvent, such as an alkylene halide, like methylene chloride, chloroform, trichloroethylene, bromoform and other short chain halogenated alkanes and alkenes with from 1 to about 6 carbon atoms and from 1 to about 6 halogen atoms including chlorofluorocarbons and hydrochlorofluorocarbons; haloaromatic compounds such as chlorobenzene, dichlorobenzene, chloronaphthalene, fluorobenzene, bromobenzene, and benzene; alkylbenzenes such as toluene and xylene; and other organic solvents which are miscible with strong organic acids and which will effectively dissolve the titanyl phthalocyanine in effective amounts of, for example, a ratio of from about 1 to 50 parts of acid to about 50 parts of cosolvent such as methylene chloride. In an embodiment of the present invention, a preferred solvent mixture is comprised of trifluoroacetic acid and methylene chloride in a ratio of from about 5 parts of acid to about 95 parts of methylene chloride to 25 parts of acid to 75 parts of methylene chloride.

With the process of the present invention, to obtain the Type X titanyl phthalocyanine with the range of small average particle diameters illustrated herein of, for example, from about 0.02 to about 0.5 micron, it is important that the titanyl phthalocyanine, such as Type I, subsequent to dissolution in the solvent mixture be slowly added to an alcohol solution, especially a water solution of methanol and water, and wherein the aforementioned alcohol solution has been cooled prior to the addition to, for example, an effective temperature of, for example, from about zero to about a $-10°$ C., whereby the Type X titanyl phthalocyanine precipitates, and can be isolated by a number of known means such as by filtration.

Different forms of titanyl phthalocyanine can be obtained depending, for example, on the solvent selected and the like as illustrated herein and in copending patent application U.S. Ser. No. 533,261. More specifically, in U.S. Ser. No. 533,261 there is disclosed the following.

Two grams of titanyl phthalocyanine synthesized by the process of Example I below was dissolved in 20 milliliters of a 1:4 mixture (V/V) of trifluoroacetic acid in methylene chloride by stirring in a 25 milliliter Erlenmeyer flask at room temperature for 5 minutes. The resultant dark green solution, which did not contain any undissolved material, was then poured into 200 milliliters of methanol in a 250 milliliter Erlenmeyer flask with vigorous stirring at room temperature. The resultant dark blue suspension was stirred at room temperature for an additional 30 minutes and then was filtered through a 4.25 centimeter glass fiber filter (Whatman GF/A grade) and the solid was washed on the funnel with about 20 milliliters of methanol. The resultant wet filter cake was transferred to a 125 milliliter flask and was redispersed in 50 milliliters of methanol. The resulting dispersion was stirred for 30 minutes, then was refiltered as above, and the solid resulting was washed on the funnel with methanol (20 milliliters), then water (2×20 milliliters) and finally with methanol again (20 milliliters). The solid was dried at 70° C. for 2 hours to yield about 1.8 grams of dark blue pigment.

TABLE 2

EFFECT OF PRECIPITANT SOLVENT ON POLYMORPHISM

| PRECIPITANT | XRPD ANALYSIS |
| --- | --- |
| Water | Type IV |
| Methanol | Type Z-1 |
| 1:1 Methanol/Water | Type X |
| 95:5 Methanol/Water | Type III (major) |
| Isopropanol | Type II |
| Diethyl Ether | Type I |
| 1:1 Toluene/Water | Type IV |
| 1:1 Chlorobenzene/Water | Type IV |
| 1:1 Acetone/Water | Type III (major) |
| 1:1 Ethanol/Water | Type X |
| 1:1 Isopropanol/Water | Type IV |
| 1:1 Ethylene Glycol/Water | Type Z-2 |
| 1:1 Dimethylformamide/Water | Type III + Type IV |
| 1:1 Dimethylsulfoxide/Water | Type III + Type IV |

When the above procedure was repeated with a series of different precipitants as illustrated in Table 2, the polymorphic form obtained was found to depend on the nature of the precipitant solvent. Thus, either of the known forms (Type I, II, III or IV) could be obtained as shown in Table 2. These were identified by comparing their XRPDs to those of the known forms shown in FIGS. 1A, 1B, 1C, 1D and 1E. Precipitation into ethylene glycol/water (1:1) also provided a polymorph of TiOPc, designated as Type Z-2. A third new Type of titanyl phthalocyanine obtained from a 50:50 mixture of methanol or ethanol with water and which has been found to afford xerographic devices having very high sensitivity to 780 nanometers light, identified herein as the X form, had the XRPD pattern shown in FIG. 1E. Although the Type X polymorph is similar to the Type IV TiOPc in that it shows its strongest peak at the Bragg angle 2 theta=27.3 degrees, it differs substantially from Type IV in that the peaks at about 2 theta=9.5 and 9.7 degrees, which are quite pronounced in the XRPD of Type IV titanyl phthalocyanine pigment and are absent in the Type X material. Additionally, a peak in the Type X form at 2 theta=about 7.4 degrees is relatively much more pronounced (compared to other peaks in the diffractograph) than the same peak in the Type IV XRPD. While these are the most predominant differences between the Type IV and Type X polymorphs, other more subtle differences apparent to those familiar with the interpretation of X-ray diffraction are also noticeable. Additionally, the X form shows broad diffraction peaks at 2 theta values of 14.1 and 17.8 degrees. The 2 theta values reported refer to diffraction of Cu alpha radiation (wavelength=0.1542 nanometer).

Also, solutions of TiOPc Type I in a 1:4 mixture of trifluoroacetic acid and methylene chloride were precipitated into varying mixtures of methanol and water ranging from 100 percent of methanol to 100 percent of water. Following the above described isolation, the samples were analyzed by XRPD, and the results are provided in Table 3 that follows.

TABLE 3

| Precipitant Solvent Ratio MeOH/H$_2$O | XRPD Analysis |
| --- | --- |
| 100:0 | Type Z-1 |
| 95:5 | Type III (major) |
| 90:10 | Type III (major) |
| 85:15 | Type III (major) |
| 80:20 | Type III (major) |
| 75:25 | Type III (major) |
| 70:30 | Type III (major) |
| 65:35 | Type III (minor) + Type X |
| 60:40 | Type X |
| 55:45 | Type X |
| 50:50 | Type X |
| 45:55 | Type X |
| 40:60 | Type X |
| 35:65 | Type X |
| 30:70 | Type IV |
| 25:75 | Type IV |
| 20:80 | Type IV |
| 0:100 | Type IV |

The data in Table 3 illustrate that at relatively high methanol concentrations the preponderant polymorph formed is the Type III form. However, beginning at a composition of about 65 percent of methanol and 35 percent of water the Type X form predominates. Polymorphically pure Type X is obtained when the acid solution is precipitated into methanol/water compositions ranging from 60 to 35 percent of methanol. Compositions containing less than about 35 percent of methanol and pure water result in the formation of the Type IV form which has the XRPD peaks at 2 theta=9.8 degrees.

Titanyl phthalocyanine can also be prepared by the reaction of diiminoisoindolene in a ratio of from 3 to 5 molar equivalents with 1 molar equivalent of titanium tetrabutoxide in a chloronaphthalene solvent in a ratio of from about 1 part diiminoisoindolene to from about 5 to about 10 parts of solvent. These ingredients are stirred and warmed to a temperature of from about 160° to about 240° C. for a period of from about 30 minutes to about 8 hours. After this time the reaction mixture is cooled to a temperature of from about 100° to about 160° C. and the mixture is filtered through a sintered glass funnel (M porosity). The titanyl phthalocyanine Type I pigment obtained is washed in the funnel with boiling dimethyl formamide (DMF) solvent in an amount which is sufficient to remove all deeply colored impurities from the solid as evidenced by a change in the color of the filtrate from an initial black color to a faint blue green. Following this, the pigment is stirred in the funnel with boiling DMF in a sufficient quantity to form a loose suspension, and this is refiltered. The solid is finally washed with DMF at room temperature, then with a small amount of methanol and is finally dried at about 70° C. for from about 2 to about 24 hours. Generally, an amount of DMF equal to the amount of solvent (chloronaphthalene) used in the synthesis reaction is required for the washing step. The yield from this synthesis is from 60 to about 80 percent. X-ray powder diffraction, XRPD, analysis of the product thus obtained indicated that it was the Type I polymorph, titanyl phthalocyanine.

The following can be accomplished as illustrated in copending application U.S. Ser. No. 533,261.

Five grams of Type I TiOPc can be dissolved in 100 milliliters of a 1:4 mixture (v/v) of trifluoroactic acid (TFA) and methylene chloride ($CH_2Cl_2$) to provide a dark green solution containing no undissolved TiOPc. The resulting solution was then divided into 5×20 milliliter portions.

A 20 milliliter portion of the above prepared solution was poured over about a 2 minute period into 100 milliliters of a well stirred solution of methanol in water (1:1, v/v). The resultant dark blue precipitate was vacuum filtered through a 4.25 centimeter glass fiber paper in a Büchner funnel. The solid was washed on the funnel with:

a) 20 milliliters of 1:1 (v/v) water/methanol
b) 3×10 milliliter portions of methanol
c) 3×5 milliliter portions of deionized water
d) 2×5 milliliter portions of methanol.

The resulting solid was dried at 70° C. for 16 hours to yield 0.95 gram of dark blue pigment. An XRPD analysis of this material showed that it was the Type X polymorphic form of TiOPc.

A second portion, 20 milliliter aliquot, of the above prepared TFA/$CH_2Cl_2$ solution was poured into 100 milliliters of isopropyl alcohol. The resulting precipitated blue powder was isolated and dried as indicated herein except that the first washing used 20 milliliters of isopropanol. The product, 0.93 gram of blue powder, was identified as Type II TiOPc by XRPD.

A third portion, 20 milliliter aliquot, of the above prepared solution was poured into 100 milliliters of diethyl ether and the precipitated product was isolated as indicated herein except that the first wash used 20 milliliters of diethyl ether. The resultant 0.82 gram of blue powder was identified as Type I TiOPc by XRPD.

A fourth portion, 20 milliliters aliquot, of the above prepared TFA/$CH_2Cl_2$ solution was added to 100 milliliters of chlorobenzene. A dark green solution was obtained. This was treated with 20 milliliters of water with vigorous stirring and the resultant suspension was further processed as indicated herein except that the initial washing step, a), was omitted to yield 0.93 gram of blue pigment which was shown to be Type IV TiOPc by XRPD.

A fifth portion, 20 milliliters, of the above TFA/$CH_2Cl_2$ solution was poured over a 1 minute period into a vigorously stirred suspension of toluene in water (1:1, v/v). The precipitated solid was isolated exactly as indicated herein. The product was 0.93 gram of blue solid which was identified as Type IV TiOPc by XRPD.

Numerous different layered photoresponsive imaging members with the phthalocyanine pigments, especially Type IV, obtained by the processes of the present invention can be fabricated. In one embodiment, thus the layered photoresponsive imaging members are comprised of a supporting substrate, a charge transport layer, especially an aryl amine hole transport layer, and situated therebetween a photogenerator layer comprised of titantyl phthalocyanine of Type IV, Type I, or Type X, with Type IV being preferred. Another embodiment of the present invention is directed to positively charged layered photoresponsive imaging members comprised of a supporting substrate, a charge transport layer, especially an aryl amine hole transport layer, and as a top overcoating titanyl phthalocyanine pigment Type IV obtained with the processes of the present invention. Moreover, there is provided in accordance with the present invention an improved negatively charged photoresponsive imaging member comprised of a supporting substrate, a thin adhesive layer, a titanyl phthalocyanine Type IV photogenerator obtained by the processes of the present invention dispersed in a polymeric resinous binder, and as a top layer aryl amine hole transporting molecules dispersed in a polymeric resinous binder.

The photoresponsive imaging members of the present invention can be prepared by a number of known methods, the process parameters and the order of coating of the layers being dependent on the member desired. The imaging members suitable for positive charging can be prepared by reversing the order of deposition of photogenerator and hole transport layers. The photogenerating and charge transport layers of the imaging members can be coated as solutions or dispersions onto selective substrates by the use of a spray coater, dip coater, extrusion coater, roller coater, wire-bar coater, slot coater, doctor blade coater, gravure coater, and the like, and dried at from 40° to about 200° C. for from 10 minutes to several hours under stationary conditions or in an air flow. The coating is carried out in such a manner that the final coating thickness is from 0.01 to about 30 microns after it has dried. The fabrication conditions for a given layer will be tailored to achieve optimum performance and cost in the final device.

Imaging members with the titanyl phthalocyanine pigments of the present invention, especially Type IV, are useful in various electrostatographic imaging and printing systems, particularly those conventionally known as xerographic processes. Specifically, the imaging members of the present invention are useful in xerographic imaging processes wherein the titanyl phthalocyanine pigments absorb light of a wavelength of from about 600 nanometers to about 900 nanometers. In these known processes, electrostatic latent images are initially formed on the imaging member followed by development, and thereafter transferring the image to a suitable substrate.

Moreover, the imaging members of the present invention can be selected for electronic printing processes with gallium arsenide light emitting diode (LED) arrays which typically function at wavelengths of from 660 to about 830 nanometers.

BRIEF DESCRIPTION OF THE DRAWINGS

For a better understanding of the present invention and further features thereof, reference is made to the following detailed description of various preferred embodiments wherein.

DESCRIPTION OF SPECIFIC EMBODIMENTS

Figure 1A:
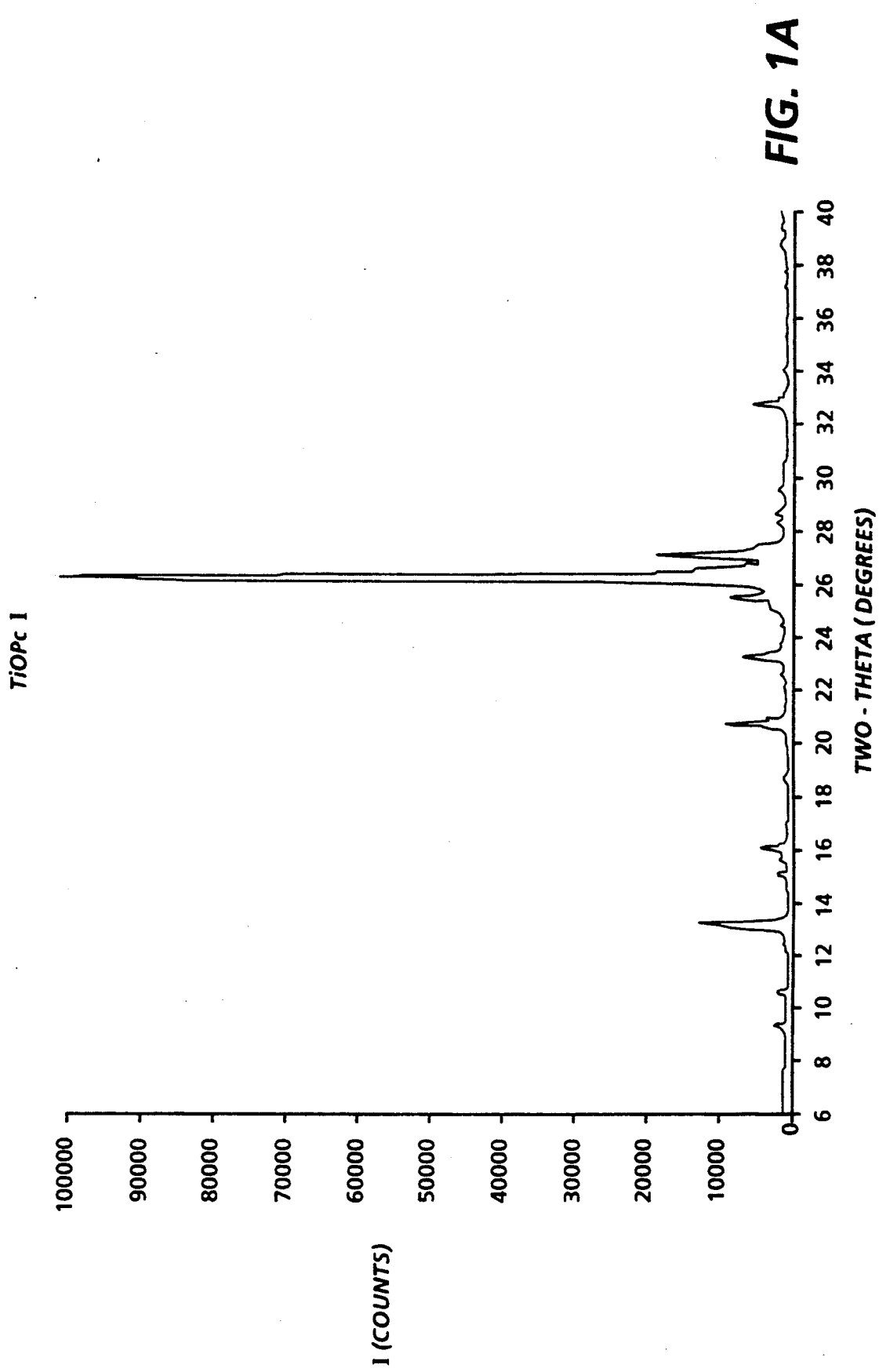
FIGS. 1A, 1B, 1C, 1D and 1E are diffractograph summaries of the XRPDs of the known polymorphs, Type I, II, III, IV, and Type X of titanyl phthalocyanine.
Figure 1B:
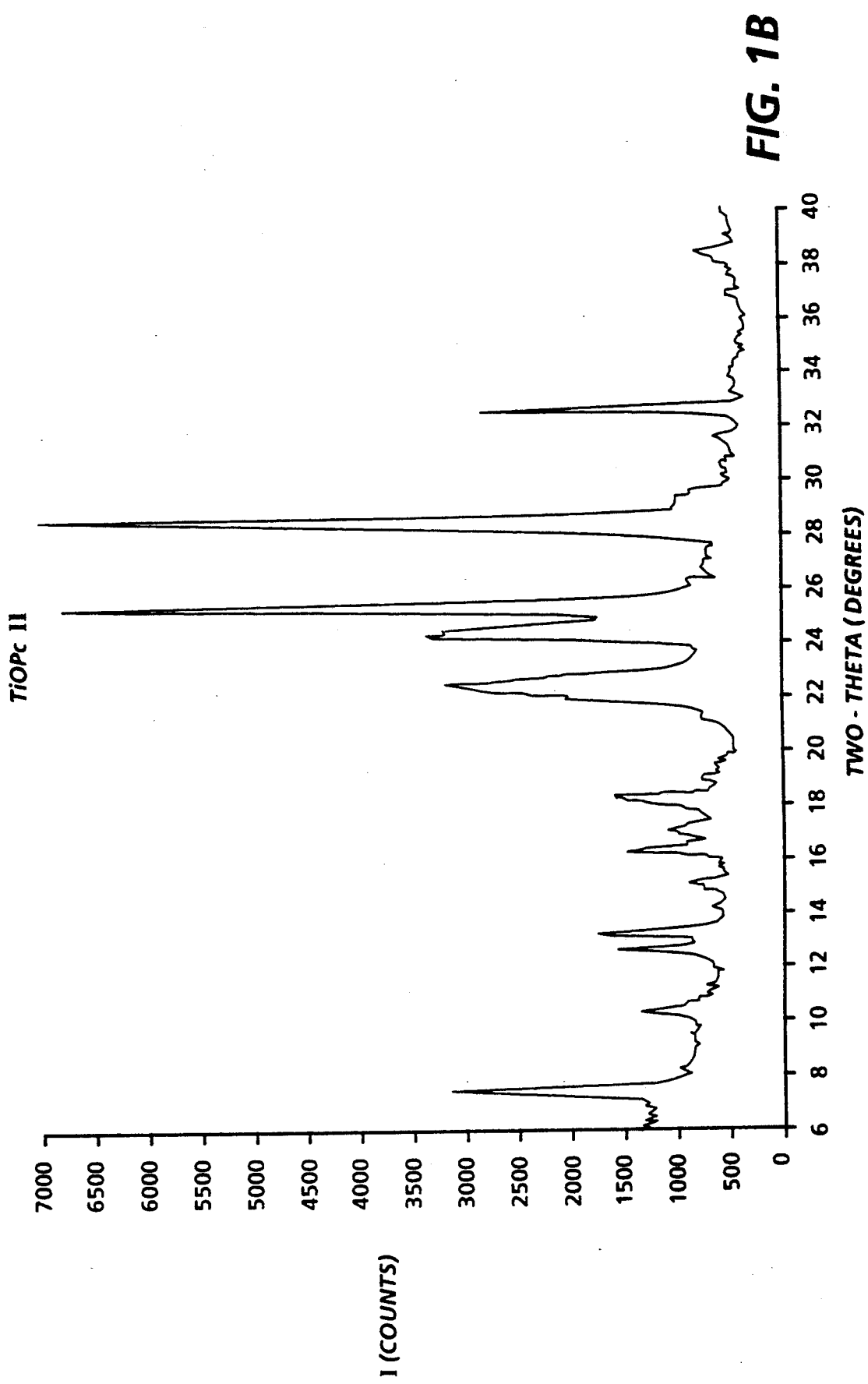
Figure 1C:
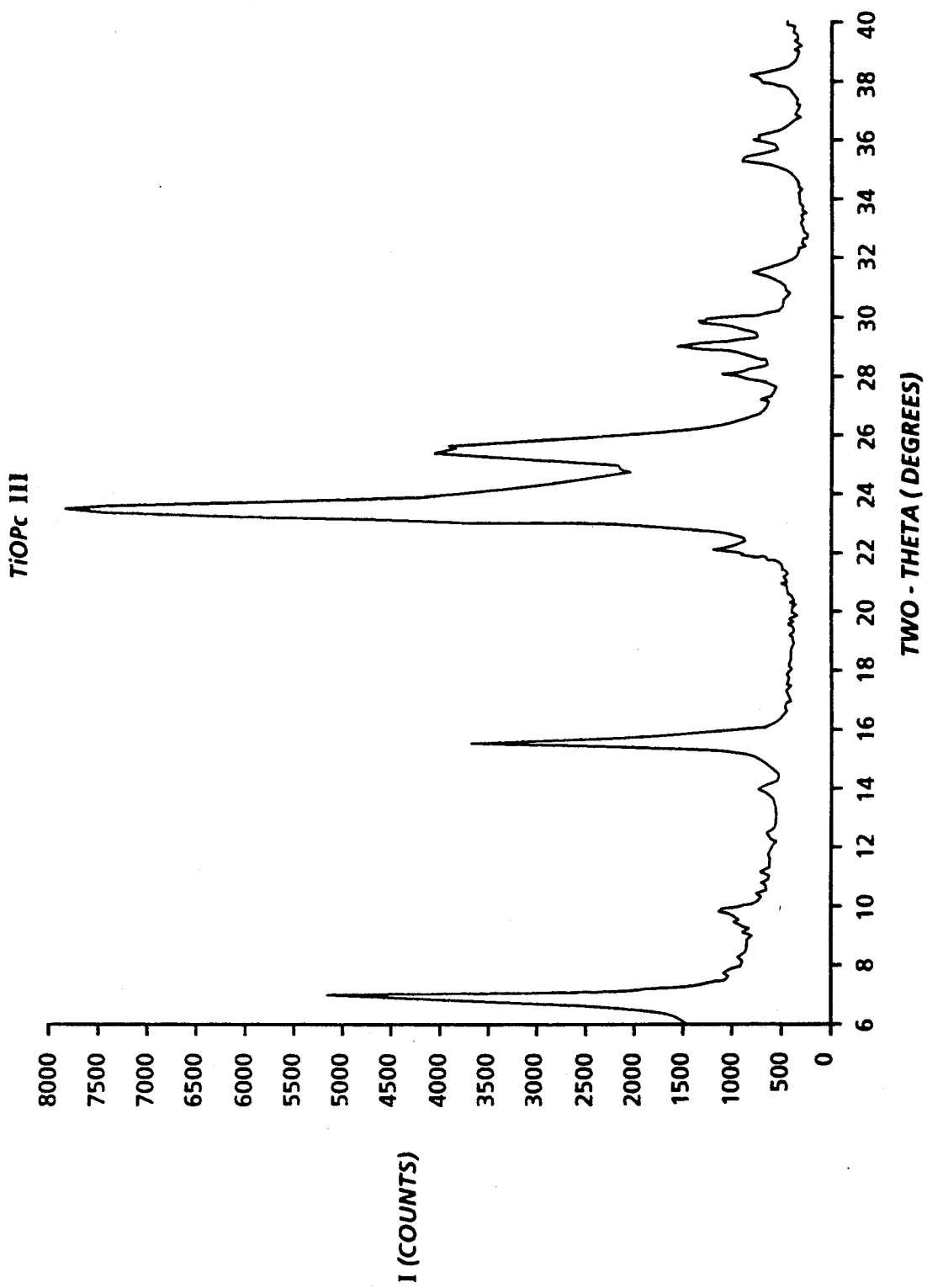
Figure 1D:
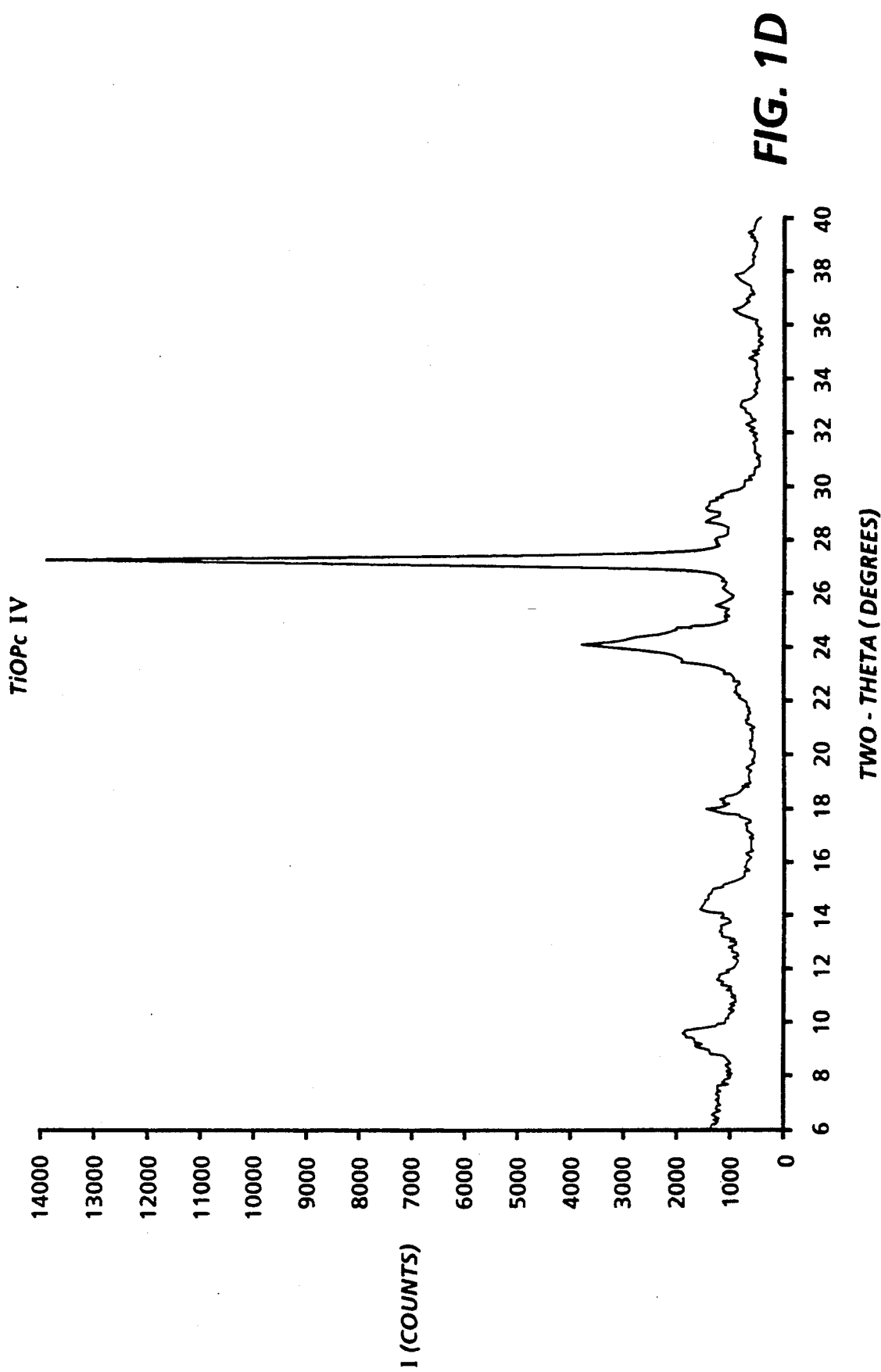
Figure 1E:
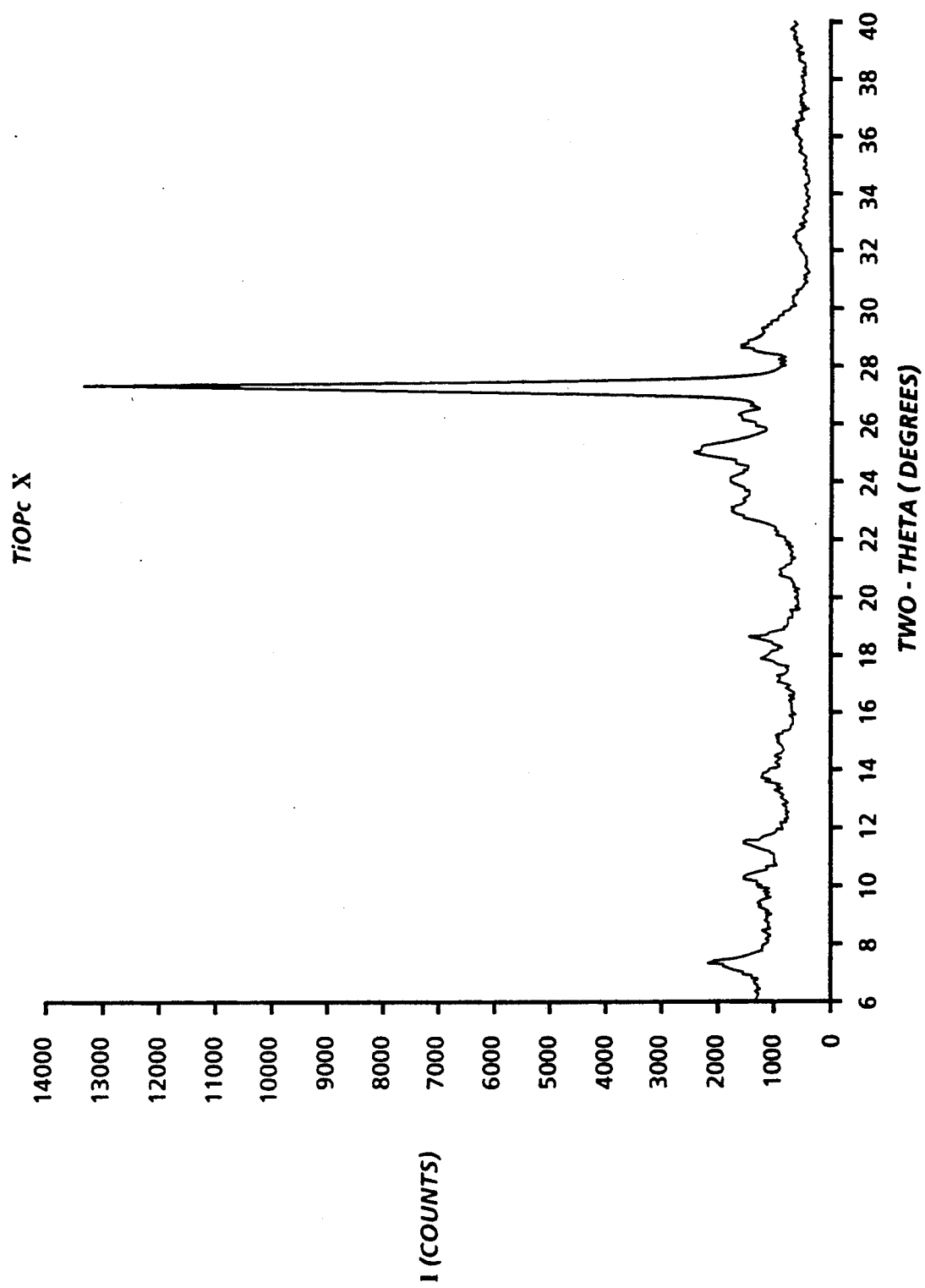
Figure 2:
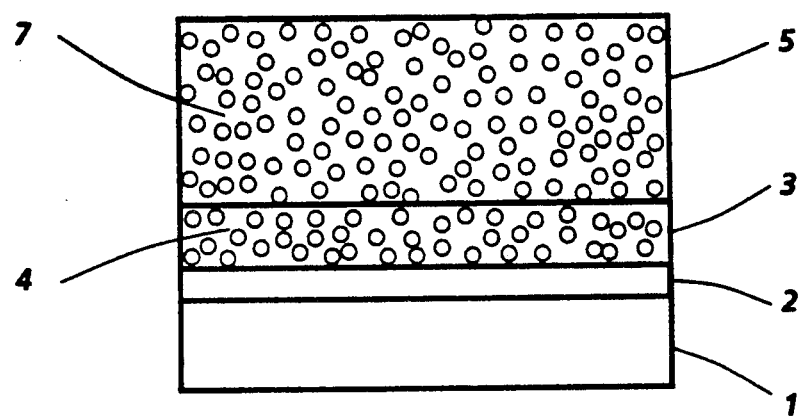
FIG. 2 is a partially schematic cross-sectional view of a negatively charged photoresponsive imaging member of the present invention.

Illustrated in FIG. 2 is a negatively charged photoresponsive imaging member of the present invention comprised of a supporting substrate 1, a solution coated adhesive layer 2 comprised, for example, of a polyester 49,000 available from Goodyear Chemical, a photogenerator layer 3 comprised of titanyl phthalocyanine Type IV obtained with the process of the present invention optionally dispersed in an inactive resinous binder, and a hole transport layer 5 comprised of N,N'-diphenyl-N,N'-bis(3-methyl phenyl)-1,1'-biphenyl-4,4'-diamine dispersed in a polycarbonate resinous binder 7.

Figure 3:
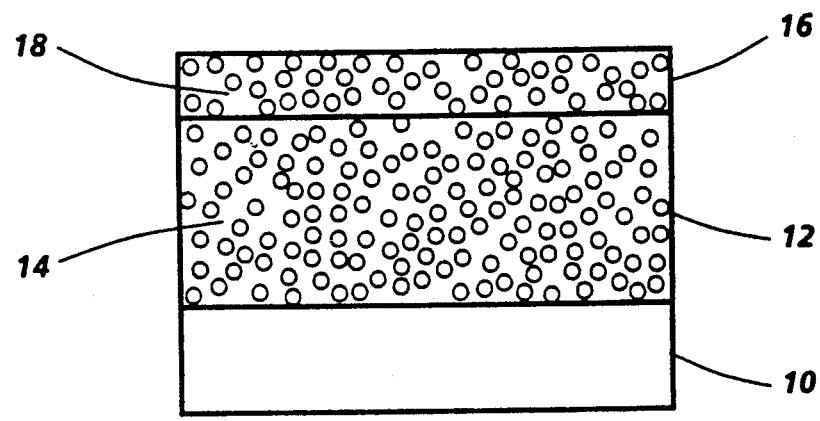
FIG. 3 is a partially schematic cross-sectional view of a positively charged photoresponsive imaging member of the present invention.

Illustrated in FIG. 3 is a positively charged photoresponsive imaging member of the present invention comprised of a substrate 10, a charge transport layer 12 comprised of N,N'-diphenyl-N,N'-bis(3-methyl phenyl)-1,1'-biphenyl-4,4'-diamine dispersed in a polycarbonate resinous binder 14, and a titanyl phthalocyanine Type IV, or Type X photogenerator layer 16 obtained with the process of the present invention optionally dispersed in an inactive resinous binder 18.

Substrate layers selected for the imaging members of the present invention can be opaque or substantially transparent, and may comprise any suitable material having the requisite mechanical properties. Thus, the substrate may comprise a layer of insulating material including inorganic or organic polymeric materials, such as MYLAR ® a commercially available polymer, MYLAR ® containing titanium, a layer of an organic or inorganic material having a semiconductive surface layer such as indium tin oxide, or aluminum arranged thereon, or a conductive material inclusive of aluminum, chromium, nickel, brass or the like. The substrate may be flexible, seamless, or rigid and many have a number of many different configurations, such as for example a plate, a cylindrical drum, a scroll, an endless flexible belt and the like. In one embodiment, the substrate is in the form of a seamless flexible belt. In some situations, it may be desirable to coat on the back of the substrate, particularly when the substrate is a flexible organic polymeric material, an anticurl layer, such as for example polycarbonate materials commercially available as MAKROLON ®.

The thickness of the substrate layer depends on many factors, including economical considerations, thus this layer may be of substantial thickness, for example, over 3,000 microns; or of minimum thickness providing there are no adverse effects on the system. In one embodiment, the thickness of this layer is from about 75 microns to about 300 microns.

With further regard to the imaging members, the photogenerator layer is preferably comprised of the titanyl phthalocyanine pigments obtained with the processes of the present invention dispersed in resinous binders. Generally, the thickness of the photogenerator layer depends on a number of factors, including the thicknesses of the other layers and the amount of photogenerator material contained in this layer. Accordingly, this layer can be of a thickness of from about 0.05 micron to about 10 microns when the titanyl phthalocyanine photogenerator composition is present in an amount of from about 5 percent to about 100 percent by volume. In one embodiment, this layer is of a thickness of from about 0.25 micron to about 1 micron, when the photogenerator composition is present in this layer in an amount of 30 to 75 percent by volume. The maximum thickness of this layer in an embodiment is dependent primarily upon factors, such as photosensitivity, electrical properties and mechanical considerations. The charge generator layer can be obtained by dispersion coating the TiOPc obtained with the processes of the present invention, and a binder resin with a suitable solvent. The binder may be omitted. The dispersion can be prepared by mixing and/or milling the TiOPc in equipment such as paint shakers, ball mills, sand mills and attritors. Common grinding media such as glass beads, steel balls or ceramic beads may be used in this equipment. The binder resin may be selected from a wide number of polymers such as poly(vinyl butyral), poly(vinyl carbazole), polyesters, polycarbonates, poly(vinyl chloride), polyacrylates and methacrylates, copolymers of vinyl chloride and vinyl acetate, phenoxy resins, polyurethanes, poly(vinyl alcohol), polyacrylonitrile, polystyrene, and the like. The solvents to dissolve these binders depend upon the particular resin. In embodiments of the present invention, it is desirable to select solvents that do not effect the other coated layers of the device. Examples of solvents useful for coating TiOPc dispersions to form a photogenerator layer are ketones, alcohols, aromatic hydrocarbons, halogenated aliphatic hydrocarbons, ethers, amines, amides, esters, and the like. Specific examples are cyclohexanone, acetone, methyl ethyl ketone, methanol, ethanol, butanol, amyl alcohol, toluene, xylene, chlorobenzene, carbon tetrachloride, chloroform, methylene chloride, trichloroethylene, tetrahydrofuran, dioxane, diethyl ether, dimethylformamide, dimethylacetamide, butyl acetate, ethyl acetate and methoxyethyl acetate, and the like.

The coating of the TiOPc dispersion in embodiments of the present invention can be accomplished with spray, dip or wire-bar methods such that the final dry thickness of the charge generator layer is from 0.01 to 30 microns and preferably from 0.1 to 15 microns after being dried at 40° to 150° C. for 5 to 90 minutes.

Illustrative examples of polymeric binder resinous materials that can be selected for the photogenerator pigment include those polymers as disclosed in U.S. Pat.

No. 3,121,006, the disclosure of which is totally incorporated herein by reference.

As adhesives, preferably situated between the supporting substrate and the photogenerating layer, there can be selected various known substances inclusive of polyesters, polyamides, poly(vinyl butyral), poly(vinyl alcohol), polyurethane and polyacrylonitrile. This layer is of a thickness of from about 0.05 micron to 1 micron. Optionally, this layer may contain conductive and nonconductive particles such as zinc oxide, titanium dioxide, silicon nitride, carbon black, and the like to provide, for example, in embodiments of the present invention desirable electrical and optical properties.

Aryl amines selected for the hole transporting layer which generally is of a thickness of from about 5 microns to about 75 microns, and preferably of a thickness of from about 10 microns to about 40 microns, include molecules of the following formula:

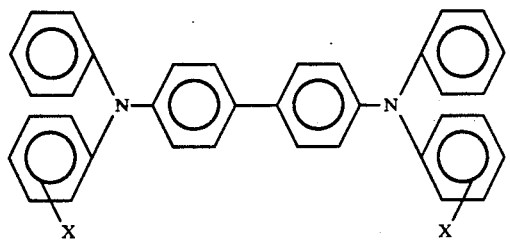

dispersed in a highly insulating and transparent organic resinous binder wherein X is an alkyl group or a halogen, especially those substituents selected from the group consisting of (ortho) $CH_3$, (para) $CH_3$, (ortho) Cl, (meta) Cl, and (para) Cl.

Examples of specific aryl amines are N,N'-diphenyl-N,N'-bis(alkylphenyl)-1,1-biphenyl-4,4'-diamine wherein alkyl is selected from the group consisting of methyl, such as 2-methyl, 3-methyl and 4-methyl, ethyl, propyl, butyl, hexyl, and the like. With chloro substitution, the amine is N,N'-diphenyl-N,N'-bis(halo phenyl)-1,1'-biphenyl-4,4'-diamine wherein halo is 2-chloro, 3-chloro or 4-chloro. Other known hole transporting compounds can be selected. Other known charge transport layer molecules can be selected, reference for example U.S. Pat. Nos. 4,921,773 and 4,464,450, the disclosures of which are totally incorporated herein by reference.

Examples of the highly insulating and transparent resinous material or inactive binder resinous material for the transport layers include materials such as those described in U.S. Pat. No. 3,121,006, the disclosure of which is totally incorporated herein by reference. Specific examples of organic resinous materials include polycarbonates, acrylate polymers, vinyl polymers, cellulose polymers, polyesters, polysiloxanes, polyamides, polyurethanes and epoxies as well as block, random or alternating copolymers thereof. Preferred electrically inactive binders are comprised of polycarbonate resins having a molecular weight of from about 20,000 to about 100,000 with a molecular weight of from about 50,000 to about 100,000 being particularly preferred. Generally, the resinous binder contains from about 10 to about 75 percent by weight of the active material corresponding to the foregoing formula, and preferably from about 35 percent to about 50 percent of this material.

Also, included within the scope of the present invention are methods of imaging and printing with the photoresponsive devices illustrated herein. These methods generally involve the formation of an electrostatic latent image on the imaging member, followed by developing the image with a toner composition, reference U.S. Pat. Nos. 4,560,635; 4,298,697 and 4,338,390, the disclosures of which are totally incorporated herein by reference, subsequently transferring the image to a suitable substrate, and permanently affixing the image thereto. In those environments wherein the device is to be used in a printing mode, the imaging method involves the same steps with the exception that the exposure step can be accomplished with a laser device or image bar.

The invention will now be described in detail with reference to specific preferred embodiments thereof, if being understood that these examples are intended to be illustrative only. The invention is not intended to be limited to the materials, conditions, or process parameters recited herein, it being noted that all parts and percentages are by weight unless otherwise indicated. Comparative data and Examples are also presented.

EXAMPLE I

Synthesis of Type I Titanyl Phthalocyanine

A 250 milliliter three-necked flask fitted with mechanical stirrer, condenser and thermometer maintained under an atmosphere of argon was charged with 1,3-diiminoisoindolene (14.5 grams–0.1 mole), titanium tetrabutoxide (8.5 grams–0.025 mole; Aldrich) and 75 milliliters of 1-chloronaphthalene. The mixture was stirred and warmed. At 140° C. the mixture turned dark green and began to reflux. At this time, the vapor (this was identified as n-butanol by gas chromatography) was allowed to escape to the atmosphere until the reflux temperature reached 200° C. The reaction was maintained at this temperature for two hours then was cooled by removal of the heat source to 150° C. The product was filtered through a 150 milliliter M-porosity sintered glass funnel which was preheated to approximately 150° C. with boiling DMF, and then washed thoroughly with three portions of 100 milliliters of boiling DMF, followed by three portions of 100 milliliters DMF at room temperature, and then three portions of 50 milliliters of methanol, thus providing 10.3 grams (72 percent yield) of a shiny purple pigment which was identified as Type I TiOPc by XRPD.

EXAMPLE II

Preparation of Type IV TiOPc 2 grams of Type I TiOPc, prepared as described in Example I, was dissolved in 20 milliliters of a mixture of trifluoroacetic acid and methylene chloride (1:4, v/v), and added over a 2 minute period to a rapidly stirred solution of methanol (100 milliliters) and water (100 milliliters). The resultant coarse suspension was stirred at room temperature for 45 minutes then was allowed to settle. The supernatant liquid was decanted and the blue residue was redispersed in 100 milliliters of methanol by stirring for 30 minutes. The suspension was filtered using a 7 centimeter diameter glass fiber filter in a porcelain funnel. The solid was then twice redispersed in 100 milliliters of hot (about 90° C.) deionized water and filtered by vacuum filtration through a 7 centimeter diameter porcelain funnel which was fitted with a Whatman 934-AH grade filter fiber. Finally, the solid, which was identified as Type X titanyl phthalocyanine on the basis of its XRPD spectrum, was redispersed in 100 milliliters of monochlorobenzene, filtered and oven dried at a temperature of 70° C. for a period of 1 hour to provide 1.6 grams of a powdery blue pigment which was identified as Type IV titanyl phthalocyanine by XRPD.

The titanyl phthalocyanines were selected as photogenerating layers for layer imaging member prepared by the following procedure. An aluminized MYLAR ® substrate, about 4 mil in thickness, was coated with a Nylon 8 solution, prepared by dissolving 5 grams of Nylon 8 (Dainippon Ink and Chemical Company), 16 grams of n-butanol in 24 grams of methanol and 4 grams of water using a 1 mil gap applicator. This layer was dried at 135° C. for 20 minutes; the final thickness was measured to be 0.6 micron. A dispersion of the TiOPc Type IV was prepared by ball milling 0.35 gram of the TiOPc, respectively, and poly(vinyl butyral) in 13.4 grams of butyl acetate in a 30 milliliter jar containing 70 grams of ⅛ inch stainless steel balls. The dispersion was milled for 20 hours then was coated onto the Nylon 8 layer described above using a 1 mil applicator. The thus formed photogenerating layer was dried at 100° C. for 10 minutes to a final thickness of about 0.40 micron.

Hole transporting layer solutions were prepared by dissolving 5.4 grams of N,N'-diphenyl-N,N-bis(3-methyl phenyl)-1,1'-biphenyl-4,4'-diamine, 8.1 grams of polycarbonate in 57.6 grams of chlorobenzene. The solution was coated onto the TiOPc Type IV generator layer using an 8 mil film applicator. The charge transporting layer thus obtained was dried at 115° C. for 60 minutes to provide a final thickness of about 23 microns.

The xerographic electrical properties of a photoresponsive imaging member prepared as described above were determined by electrostatically charging the surface thereof with a corona discharge source until the surface potential, as measured by a capacitatively coupled probe attached to an electrometer, attained an initial dark value, $V_0$, of $-800$ volts. After resting for 0.5 second in the dark, the charged member reached a surface potential, $V_{ddp}$, or dark development potential. The member was then exposed to filtered light from a Xenon lamp. A reduction in surface potential from $V_{ddp}$ to a background potential, $V_{bg}$, due to the photodischarge effect, was observed. The dark decay in volts per second was calculated as $(V_0 - V_{ddp})/0.5$. The percent of photodischarge was calculated as $100 \times (V_{ddp} - V_{bg})/V_{ddp}$. The half exposure energy, $E_{\frac{1}{2}}$, the required exposure energy causing reduction of the $V_{ddp}$ to half of its initial value, was determined. The wavelength of light selected for our measurements was 800 nanometers. This imaging member had a dark decay of 15 to 20 volts per second, and $E_{\frac{1}{2}}=0.8$ ergs/cm$^2$. Discharge at 5 and 10 ergs/cm$^2$ was 87 and 90 percent, respectively.

In Table 4 that follows there is presented information and data for imaging members identified as Devices 1 and 2, which members are comprised of the components illustrated in this Example. Devices 1 and 2 are thus comprised of equivalent components for the data presented, except that the titanyl phthalocyanines Type IV obtained from the Examples listed were selected. NMP refers to N-methyl pyrrolidone, ClNp refers to chloronaphthalene, and the salts listed were selected as one of the reactants.

EXAMPLE III

Synthesis of Type I Titanyl Phthalocyanine

A titanyl phthalocyanine Type I pigment was prepared by repeating the process of Example I with 1,3-diiminoisoindolene (14.5 grams -0.1 mole), titanium tetrapropoxide (7.1 grams-0.025 mole; Aldrich) and 75 milliliters of 1-chloronaphthalene. There were obtained 11.3 grams (78 percent) of a shiny purple solid which was identified as Type I titanyl phthalocyanine by XRPD.

Preparation of Type IV TiOPc

A titanyl phthalocyanine Type IV pigment was prepared by repeating the process of Example II, and there were obtained 1.7 grams (85 percent) of a powdery blue solid which was identified as Type IV titanyl phthalocyanine by XRPD.

The Type IV pigment prepared was selected for use as a photogenerator in the layered imaging member of Example II, and the results thereof are reported in Table 4. The dark decay for one imaging member was about 15 to 20 volts per second, and the $E_{\frac{1}{2}}$ was 0.9 ergs/cm$^2$. Discharge at 5 and 10 ergs/cm$^2$ was 88 and 91 percent, respectively.

EXAMPLE IV

Synthesis of Type I Titanyl Phthalocyanine

A titanyl phthalocyanine pigment was prepared by repeating the process of Example I with 1,3-diiminoisoindolene (14.5 grams-0.1 mole), titanium tetrabutoxide (8.5 grams-0.025 mole; Aldrich) and 75 milliliters of N-methylpyrrolidone. There resulted 9.6 grams (67 percent) of a shiny purple solid which was identified as Type I titanyl phthalocyanine by XRPD.

Preparation of Type IV TiOPc

A titanyl phthalocyanine was prepared by repeating the process of Example II. There resulted 1.5 grams (75 percent) of a powdery blue solid which was identified as Type IV titanyl phthalocyanine by XRPD.

EXAMPLE V

Synthesis of Type I Titanyl Phthalocyanine

A titanyl phthalocyanine was prepared by repeating the process of Example I with the reactants 1,3-diiminoisoindolene (14.5 grams-0.1 mole), titanium tetrapropoxide (7.1 grams-0.025 mole; Aldrich) and 75 milliliters of N-methylpyrrolidone. There resulted 9.1 grams (63 percent) of a shiny purple solid which was identified as Type I titanyl phthalocyanine by XRPD.

Preparation of Type IV TiOPc

A titanyl phthalocyanine pigment was prepared by repeating the process of Example II. There resulted 1.5 grams (75 percent) of a powdery blue solid which was identified as Type IV titanyl phthalocyanine by XRPD.

EXAMPLE VI

Preparation of Type IV Titanyl Phthalocyanine

Two grams of Type I TiOPc were dissolved in 20 milliliters of a mixture of trifluoroacetic acid and methylene chloride (1:4, v/v), and added over a 2 minute period to a rapidly stirred solution of methanol (50 milliliters) and water (150 milliliters). The resultant coarse suspension was stirred at room temperature for 45 minutes then was allowed to settle. The supernatant liquid was decanted and the blue residue was redispersed in 100 milliliters of methanol by stirring for 30 minutes. The suspension was filtered using a 7 centimeter diameter glass fiber filter in a porcelain funnel. The solid was then twice redispersed in 100 milliliters of hot (about 90° C.) deionized water and filtered by vacuum filtration through a 7 centimeter diameter porcelain funnel which was fitted with a Whatman 934-AH grade filter fiber. Finally, the solid, which was identified as Type IV titanyl phthalocyanine on the basis of its XRPD spectrum, was redispersed in 100 milliliters of monochlorobenzene, filtered and oven dried at a temperature of 70° C. for a period of 1 hour to provide 1.6 grams of a powdery blue pigment which was identified as Type IV titanyl phthalocyanine by XRPD. The aforementioned Type IV pigment was selected for use as a photogenerator in a layered imaging member of Example II, which member had dark decay of 31 volts per second, and an $E_{\frac{1}{2}} = 1.3$ ergs/cm². Discharge at 5 and 10 ergs/cm² was 81 and 87 percent, respectively.

EXAMPLE VII

Synthesis of Type I Titanyl Phthalocyanine

A 1 liter three-necked flask fitted with mechanical stirrer, Claisen Head condenser and thermometer maintained under an atmosphere of argon was charged with diiminoisoindolene (94.3 grams, 0.65 mole), titanium tetrabutoxide (55.3 grams, 0.1625 mole; Aldrich) and 650 milliliters of 1-chloronaphthalene. The mixture was stirred and warmed. At about 140° C. the mixture turned dark green and began to reflux. At this time the Claisen Head stopcock was opened and the vapor (this was identified as n-butanol by gas chromatography) was allowed to escape in a dropwise manner until the reflux temperature reached 200° C. The reaction was maintained at about this temperature for two hours then was cooled by removal of the heat source to 150° C. Filtration using a 1 liter sintered glass funnel and washing with 3×1 liter portions of boiling DMF, 3×1 liter portions of DMF at room temperature, about 25° C., then 3×1 liter portions of methanol, provided 69.7 grams (74 percent yield) of blue pigment which was identified as Type I TiOPc by XRPD.

The elemental analysis of the above obtained Type I product was: C, 67.38; H, 2.78; N, 19.10; Ash, 13.61. TiOPc requires: C, 66.67; H, 2.80; N, 19.44; Ash, 13.61.

EXAMPLE VIII

Preparation of Type X Titanyl Phthalocyanine

To a solution of trifluoroacetic acid (100 milliliters) in methylene chloride (400 milliliters) stirred with a magnet in a 1 liter Erlenmeyer flask was added 50 grams of Type I TiOPc, synthesized as in Example I, over a 2 minute period. No heat was evolved and the resultant dark green solution was stirred at room temperature for 15 minutes. The solution was poured over a 2 minute period into a solution of methanol (2.5 liters) and water (2.5 liters) contained in a 12 liter glass cylinder, which was stirred with a 100 millimeters long magnetic stir bar at a rate which was sufficient to create a vortex, which extended almost to the bottom of the flask. Following the addition, the resultant blue suspension was stirred at room temperature for 45 minutes, then was allowed to stand undisturbed for 25 minutes. The yellowish brown supernatant liquid was almost completely separated from the precipitated solid by carefully decanting the reaction vessel. The remaining blue residue was redispersed in 2 liters of methanol by stirring with a magnet for 1 hour at room temperature. The resultant suspension was filtered through an 18 centimeter glass fiber filter in a porcelain filter funnel and the filter cake was washed in succession with 2×100 milliliters of methanol, 2×100 milliliters of water, 500 milliliters of water, then 2×100 milliliters of methanol. The product was dried at 75° C. overnight to provide 47.6 grams (95 percent yield) of dark blue pigment which was identified as Type X TiOPc by XRPD.

EXAMPLE IX

Preparation of Type IV Titanyl Phthalocyanine

Two grams of Type I TiOPc prepared as described in Example I was dissolved by stirring in 20 milliliters of a mixture of trifluoroacetic acid and methylene chloride (1:4, v/v) for 5 minutes, and added dropwise over a 20 minute period to a rapidly stirred solution of methanol (100 milliliters) and water (100 milliliters), which solution was submerged in an ice-water bath so as to maintain a temperature of less than 5° C. during the entire addition period. After the addition was completed, the ice bath was removed and the resultant coarse suspension was stirred at room temperature for 45 minutes then was allowed to settle. The supernatant liquid was decanted by careful pouring into a flask and the blue residue, identified as Type X titanyl phthalocyanine on the basis of its XRPD spectrum, which Type X has a particle size diameter of from about 0.05 to about 0.1 micron as determined by TEM, was redispersed in 100 milliliters of methanol by stirring at room temperature for 30 minutes. The suspension was filtered using a 7 centimeter diameter glass fiber filter (Whatman Grade 934-AH) in porcelain funnel. The solid was then twice redispersed in 100 milliliters of hot (about 90° C.) deionized water and filtered as above. Finally, the solid, identified as Type X titanyl phthalocyanine on the basis of its XRPD spectrum, was redispersed in 100 milliliters of monochlorobenzene by stirring at room temperature for 30 minutes, filtered and oven dried at a temperature of 70° C. for a period of 1 hour to provide 1.6 grams of a powdery blue pigment which was identified as Type IV titanyl phthalocyanine by XRPD.

TABLE 4

| Example | Device | Titanium Salt | Reaction Solvent | Dark Decay (v/s) | % Discharge @ 5 ergs/cm² | % Discharge @ 10 ergs/cm² | $E_{\frac{1}{2}}$ (ergs/cm²) | Vddp (volt) |
|---|---|---|---|---|---|---|---|---|
| V | 1 | Ti(OPr)₄ | NMP | 17–19 | 84.0 | 87.5 | 1.0 | −804 to −819 |
|  | 2 |  |  | 16–20 | 84.0 | 88.0 | 1.1 | −719 to −802 |
|  |  |  |  | 15–17 | 82.0 | 86.0 | 1.1 | −812 to −823 |
|  |  |  |  | 13–15 | 82.5 | 87.0 | 1.2 | −812 to −818 |
| IV | 1 | Ti(OBu)₄ | NMP | 13–16 | 86.0 | 89.5 | 1.0 | −800 to −829 |
|  | 2 |  |  | 13–15 | 87.0 | 90.0 | 0.9 | −817 to −823 |
|  |  |  |  | 11–16 | 85.5 | 89.0 | 1.0 | −822 to −839 |
|  |  |  |  | 11–13 | 85.0 | 89.0 | 0.9 | −812 to −821 |

TABLE 4-continued

| Example | Device | Titanium Salt | Reaction Solvent | Dark Decay (v/s) | % Discharge @ 5 ergs/cm$^2$ | % Discharge @ 10 ergs/cm$^2$ | E$_{\frac{1}{2}}$ (ergs/cm$^2$) | Vddp (volt) |
|---|---|---|---|---|---|---|---|---|
| III | 1 | Ti(OPr)$_4$ | ClNp | 20–22 | 88.0 | 90.0 | 0.9 | −799 to −802 |
|  | 2 |  |  | 18–21 | 88.0 | 91.0 | 0.9 | −800 to −818 |
|  |  |  |  | 12–18 | 87.5 | 90.5 | 0.7 | −806 to −837 |
|  |  |  |  | 11–14 | 87.0 | 90.0 | 0.8 | −808 to −823 |
| I | 1 | Ti(OBu)$_4$ | ClNp | 18–21 | 87.0 | 90.0 | 0.8 | −796 to −810 |
|  | 2 |  |  | 18–19 | 87.5 | 90.0 | 0.8 | −800 to −806 |
|  |  |  |  | 12–14 | 87.0 | 89.5 | 0.9 | −808 to −821 |
|  |  |  |  | 12–16 | 87.0 | 90.0 | 0.8 | −806 to −841 |

Two grams of as-synthesize TiOPc (Type I) obtained by the process of Example I were dissolved in 20 milliliters of a 1:4 mixture of trifluoroacetic acid and methylene chloride over a period of approximately five minutes. The dark green solution was then added dropwise over a period of approximately 10 to 15 minutes into 200 milliliters of a vigorously stirred 1:1 mixture of methanol and water which was maintained at a temperature of 0° C. in a ice bath. Stirring was continued at room temperature for one hour after addition of the dissolved solution. The resulting suspension was then filtered through a Buchner Funnel fitted with a glass fiber filter paper, and then washed by redispersion and subsequent filtering in methanol, hot water (>90° C.) and monochlorobenzene. The washed pigment was then oven dried at a temperature of 70° C. for two hours to afford 1.6 grams of a powdery blue pigment, which was identified as Type IV titanyl phthalocyanine by X-Ray Powder Diffraction. Particle size was measured by TEM and found to be about 0.05 to about 0.1 micron in average particle diameter with very few particles larger than 0.1 micron in average particle diameter being present.

Particle size of the above produced titanyl phthalocyanine was determined by TEM. Samples were prepared by dispersing approximately 1 milligram of the dried Type IV titanyl phthalocyanine pigment into approximately 2 milliliters of methanol and sonicating for 2 minutes. A small drop, about 0.05 milliliter, was removed from the dispersion by micropipette and deposited onto a carbon-formvar coated copper grid. Samples were examined in transmission on a Phillips CM20 STEM instrument at an accelerating voltage of 160 Kv. Particle size was measured from the resulting photomicrograph using a caliper.

Also, with the process of the present invention there can be obtained Type IV titanyl phthalocyanine with small particle sizes of, for example, from about 0.02 to about 0.05, 0.05 to about 0.3, and preferably from about 0.05 to about 0.1 micron by the treatment or dispersion of Type X in a halobenzene, such as chlorobenzene, as illustrated herein and in copending application U.S. Ser. No. 683,935, the disclosure of which is totally incorporated herein by reference.

Other modifications of the present invention may occur to those skilled in the art subsequent to a review of the present application and these modifications, including equivalents thereof, are intended to be included within the scope of the present invention.

What is claimed is:

1. A process for the preparation of Type X titanyl phthalocyanine consisting of reacting titanium tetraalkoxide and diiminoisoindolene in the presence of a halonaphthalene solvent; dissolving the resulting Type I titanyl phthalocyanine in a trihaloacetic acid and an alkylene halide wherein alkylene contains from between 1 to about 6 carbon atoms; adding the resulting mixture slowly to a cold aqueous aliphatic alkane alcohol solution wherein alkane contains from 1 to about 12 carbon atoms; and thereafter isolating the resulting Type X titanyl phthalocyanine with an average volume particle size diameter of from about 0.05 to about 0.1 micron.

2. A process in accordance with claim 1 wherein the resulting mixture is slowly added to the aqueous alcohol solution over a period of time of from about 10 minutes to about 30 minutes.

3. A process in accordance with claim 1 wherein the resulting mixture is slowly added to the aqueous alcohol solution over a period of time of from about 20 minutes.

4. A process in accordance with claim 1 wherein said cold aqueous alcohol solution is comprised of an aliphatic alcohol and water.

5. A process in accordance with claim 1 wherein the alcohol is methanol.

6. A process in accordance with claim 1 wherein said cold aqueous alcohol solution is maintained at a temperature of from about zero to about a −10° C.

7. A process in accordance with claim 1 wherein there are selected titanium tetrabutoxide, 1,3-diiminoisoindolene, chloronaphthalene, methylene chloride, and trichloroacetic acid.

8. A process in accordance with claim 3 wherein the chloronaphthalene is 1-chloronaphthalene.

9. A process in accordance with claim 1 wherein the mixture resulting after the addition to said aqueous alcohol solution is maintained at a temperature of less than about 0° C.

10. A process in accordance with claim 1 wherein the resulting mixture is added dropwise to said cold aqueous alcohol solution.

11. A process in accordance with claim 10 wherein said aqueous alcohol solution is comprised of an aliphatic alcohol and water.

12. A process for the preparation of Type X titanyl phthalocyanine consisting of reacting titanium tetrabutoxide and diiminoisoindolene in the presence of a chloronaphthalene solvent; dissolving the resulting Type I titanyl phthalocyanine in a trihaloacetic acid and an alkylene halide wherein alkylene contains from between 1 to about 6 carbon atoms; adding the resulting mixture slowly to a cold aqueous aliphatic alkane alcohol solution wherein alkane contains from 1 to about 12 carbon atoms; maintaining the resulting mixture at a temperature of from about −10° to about 0° C.; and thereafter isolating the resulting Type X titanyl phthalocyanine with an average volume particle size diameter of from about 0.05 to about 0.1 micron.

13. A process in accordance with claim 12 wherein the aqueous alcohol solution is comprised of water and methanol.

14. A process in accordance with claim 12 wherein the aqueous alcohol solution is comprised of water and methanol in a ratio of about 1:1.

15. A process in accordance with claim 12 wherein tetrabutoxide, 1-chloronaphthalene, 1,3-diiminoisoindolene, methylene chloride, and trichloroacetic acid are selected.

16. A process in accordance with claim 12 wherein the resulting mixture is added to said cold aqueous alcohol solution over a period of time of from about 10 to about 30 minutes.

17. A process for the preparation of Type IV titanyl phthalocyanine with an average particle size diameter of from about 0.05 to about 0.1 micron which comprises the treatment of the titanyl phthalocyanine Type X of claim 1 with a halobenzene.

18. A process in accordance with claim 17 wherein the halobenzene is chlorobenzene.

19. A process in accordance with claim 17 wherein the treatment comprises the addition of the Type X to the halobenzene.

20. A process in accordance with claim 17 wherein subsequent to said treatment there is isolated by filtration titanyl phthalocyanine Type IV.

21. A process in accordance with claim 1 wherein the Type I phthalocyanine is subjected to washing with dimethylformamide.

22. A process in accordance with claim 1 wherein the addition of the titanium tetraalkoxide is accomplished subsequent to dissolving the diiminoisoindolene in an organic solvent.

23. A process in accordance with claim 7 wherein the diiminoisoindolene is added in an amount of from about 1 part to about 10 parts for each part of titanium tetrabutoxide that is selected on a molar basis.

24. A process for the preparation of titanyl phthalocyanine consisting of adding titanium tetrabutoxide to 1,3-diiminoisoindolene in a 1-chloronaphthalene solvent; heating said mixture to reflux temperature of from about 130° to about 180° C.; removing any volatile byproducts by distillation thereby increasing the reflux temperature from about 180° to about 200° C.; maintaining the reaction mixture at said temperature for a time period of from about 0.5 to about 8 hours; followed by cooling the reaction mixture to a temperature of from about 130° to about 180° C. by removal of the heat source; and filtering said hot mixture to separate the solid titanyl phthalocyanine Type I product; dissolving the resulting Type I titanyl phthalocyanine in a trihaloacetic acid and an alkylene halide wherein alkylene contains from 1 to about 6 carbon atoms, adding the resulting mixture slowly to a cold aqueous aliphatic alkane alcohol solution, wherein alkane contains 1 to about 12 carbon atoms, and thereafter isolating the resulting Type X titanyl phthalocyanine with a average volume particle size diameter of from about 0.05 to about 0.1 micron.

25. A process in accordance with claim 24 wherein isolation of the product is accomplished by filtration with a porcelain funnel fitted with a glass fiber filter.

* * * * *